United States Patent
Nakagaki et al.

(10) Patent No.: US 12,460,385 B2
(45) Date of Patent: Nov. 4, 2025

(54) POWER TRANSMISSION DEVICE FOR VEHICLE

(71) Applicant: Hitachi Construction Machinery Co., Ltd., Tokyo (JP)

(72) Inventors: Makoto Nakagaki, Tsuchiura (JP); Takuma Koinuma, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 18/279,911

(22) PCT Filed: Mar. 18, 2022

(86) PCT No.: PCT/JP2022/012643
§ 371 (c)(1),
(2) Date: Sep. 1, 2023

(87) PCT Pub. No.: WO2023/175914
PCT Pub. Date: Sep. 21, 2023

(65) Prior Publication Data
US 2025/0027295 A1 Jan. 23, 2025

(51) Int. Cl.
*E02F 9/22* (2006.01)
*B60K 6/543* (2007.10)
(52) U.S. Cl.
CPC ............ *E02F 9/2267* (2013.01); *B60K 6/543* (2013.01); *E02F 9/2292* (2013.01); *B60Y 2200/415* (2013.01)
(58) Field of Classification Search
CPC ...... E02F 9/2267; E02F 9/2292; B60K 6/543; B60Y 2200/415
See application file for complete search history.

(56) References Cited

U.S. PATENT DOCUMENTS

| | | | |
|---|---|---|---|
| 2013/0125536 A1* | 5/2013 | Ho | E02F 9/2253 60/413 |
| 2018/0274564 A1* | 9/2018 | Digesù | F01M 5/002 |

(Continued)

FOREIGN PATENT DOCUMENTS

| | | | | |
|---|---|---|---|---|
| JP | 2001082404 A | * | 3/2001 | ............. F16H 47/04 |
| JP | 2005-90573 A | | 4/2005 | |

(Continued)

OTHER PUBLICATIONS

JP2001082404A Machine English Translation (Year: 2001).*

(Continued)

*Primary Examiner* — Jason D Shanske
*Assistant Examiner* — Matthew James O'Neill
(74) *Attorney, Agent, or Firm* — Crowell & Moring LLP

(57) ABSTRACT

A first variable relief valve (51A) allows the flow of a hydraulic oil from a first main line (37A) to a second main line (37B) to be in a blocking state in a case the pressure of the first main line (37A) is a first pressure or less and to be in a communicating state in a case the pressure of the first main line (37A) exceeds the first pressure. A second variable relief valve (51B) allows the flow of a hydraulic oil from the second main line (37B) to the first main line (37A) to be in a blocking state in a case the pressure of the second main line (37B) is a second pressure or less and to be in a communicating state in a case the pressure of the second main line (37B) exceeds the second pressure. A "power transmission capability from a first hydraulic pump motor (36) to a second hydraulic pump motor (38)" and a "power transmission capability from the second hydraulic pump motor (38) to the first hydraulic pump motor (36)" are allowed to be different from each other by setting the first pressure of the first variable relief valve (51A) to be higher than the second pressure of the second variable relief valve (51B).

6 Claims, 15 Drawing Sheets

(56) References Cited

U.S. PATENT DOCUMENTS

2020/0263392 A1    8/2020   Ito et al.
2022/0220704 A1*   7/2022   Yamada ................ E02F 9/2253

FOREIGN PATENT DOCUMENTS

| JP | 2008-39013 A | 2/2008 |
| JP | 2009-79704 A | 4/2009 |
| JP | 2020-200676 A | 12/2020 |
| WO | WO 2018/199301 A | 11/2018 |

OTHER PUBLICATIONS

International Search Report (PCT/ISA/210) issued in PCT Application No. PCT/JP2022/012643 dated Jun. 14, 2022 (5 pages).
Japanese-language Written Opinion (PCT/ISA/237) issued in PCT Application No. PCT/JP2022/012643 dated Jun. 14, 2022 (7 pages).

* cited by examiner

POWER TRANSMISSION DEVICE FOR VEHICLE

TECHNICAL FIELD

This disclosure relates to a power transmission device for a vehicle mounted on a vehicle (working vehicle) such as a wheel loader, for example.

BACKGROUND ART

Working vehicles such as wheel loaders, typically including no buffer suspension system, can receive a large swing (pitching) caused by a rotation in a forward direction when a vehicle travels. Thus, it is hard for an operator of a vehicle traveling at a constant speed, for example, in a dosing step (for discharging earth and sand), to keep a constant operating amount of an accelerator pedal to properly operate the vehicle. Such a working vehicle can cause poor ride quality and thus provide a sense of fatigue on operators.

Herein, the pitching or bounding on a traveling working vehicle increases as the total weight of "a front working machine composed of a bucket, an arm, a lift cylinder and so on included in a working vehicle" and "loads such as earth and sand supported removably by the front working machine" rises. Thus, in a case where the vehicle travels with earth and sand fully loaded onto a bucket, the ride quality, in particular, tends to deteriorate. To overcome these problems, Patent Document 1 describes a working vehicle provided with a traveling vibration suppression device, referred to as "ride control device", for example.

The ride control device is configured by connecting a hydraulic accumulator to a lift cylinder hydraulic circuit supplying a hydraulic oil to a lift cylinder via a control valve. The ride control device allows the flow of the hydraulic oil between the lift cylinder and the hydraulic accumulator by opening the control valve, and the hydraulic accumulator to absorb bottom pressure variations for the lift cylinder due to vertical movement of the working vehicle to alleviate shock to the entire vehicle body.

PRIOR ART DOCUMENT

Patent Document

Patent Document 1: Patent Publication WO 2018/199301 A

SUMMARY OF THE INVENTION

However, according to a conventional technology described in Patent Document 1, the effect of a ride control device to suppress vibration is restricted by the capacity of an accumulator. Thus, a larger vibration cannot be absorbed by an accumulator of capacity shortage, which may fail to sufficiently suppress the vibration. In addition, when a front working machine is operated with a ride control device functioning, the accumulator provides a damper effect for the front working machine, which can unstably be operated. Further, even in a case where the damper effect of the accumulator stops the operation of the front working machine, this effect allows the front working machine to move slightly, resulting in a deteriorated positioning precision or lower operability of the front working machine. Thus, the vibration of a traveling vehicle can preferably be suppressed without using an accumulator.

It is an object of the present invention to provide a power transmission device for a vehicle capable of enhancing the effect to suppress the vibration of a traveling vehicle without using an accumulator.

One embodiment of the present invention is a power transmission device for a vehicle, including: an input shaft rotated by a prime mover mounted on a vehicle, an output shaft outputting rotation to a traveling device of the vehicle, and a continuously variable transmission mechanism disposed between the input shaft and the output shaft, and changing speed of a rotation on the input shaft side and transmitting power to the output shaft side, wherein the continuously variable transmission mechanism includes: a first hydraulic pump motor disposed on the input shaft side, a second hydraulic pump motor connected to the first hydraulic pump motor via a pair of main lines composed of a first main line and a second main line, a first relief valve allowing the flow of a hydraulic oil from the first main line to the second main line to be in a blocking state in a case the pressure of the first main line is a first set pressure or less and to be in a communicating state in a case the pressure of the first main line exceeds the first set pressure, and a second relief valve allowing the flow of a hydraulic oil from the second main line to the first main line to be in a blocking state in a case the pressure of the second main line is a second set pressure or less and to be in a communicating state in a case the pressure of the second main line exceeds the second set pressure, the first hydraulic pump motor and the second hydraulic pump motor are connected via the pair of main lines disposed therebetween, and the power transmitted from the first hydraulic pump motor to the second hydraulic pump motor and the power transmitted from the second hydraulic pump motor to the first hydraulic pump motor are allowed to be different from each other by setting the first set pressure of the first relief valve to be higher than the second set pressure of the second relief valve.

In addition, one embodiment of the present invention is a power transmission device for a vehicle, including: an input shaft rotated by a prime mover mounted on a vehicle; an output shaft outputting rotation to a traveling device of the vehicle; and a continuously variable transmission mechanism disposed between the input shaft and the output shaft, and changing speed of a rotation on the input shaft side and transmitting power to the output shaft side, wherein the continuously variable transmission mechanism includes: a first electric motor generator disposed on the input shaft side; a controller connected to the first electric motor generator via a first wire; and a second electric motor generator connected to the controller via a second wire, wherein the first wire is disposed between the first electric motor generator and the controller to be capable of transmitting power, the second wire is disposed between the second electric motor generator and the controller to be capable of transmitting power, and the controller allows the power transmitted from the first electric motor generator to the second electric motor generator and the power transmitted from the second electric motor generator to the first electric motor generator to be different from each other.

One embodiment of the present invention can enhance the effect to suppress the vibration of a traveling vehicle without using an accumulator.

MODE FOR CARRYING OUT THE INVENTION

Hereinafter, a power transmission device for a vehicle according to one embodiment of the present invention will be in detail explained with reference to the accompanying drawings, by taking a case of being applied to a wheel loader as a vehicle.

Figure 1:
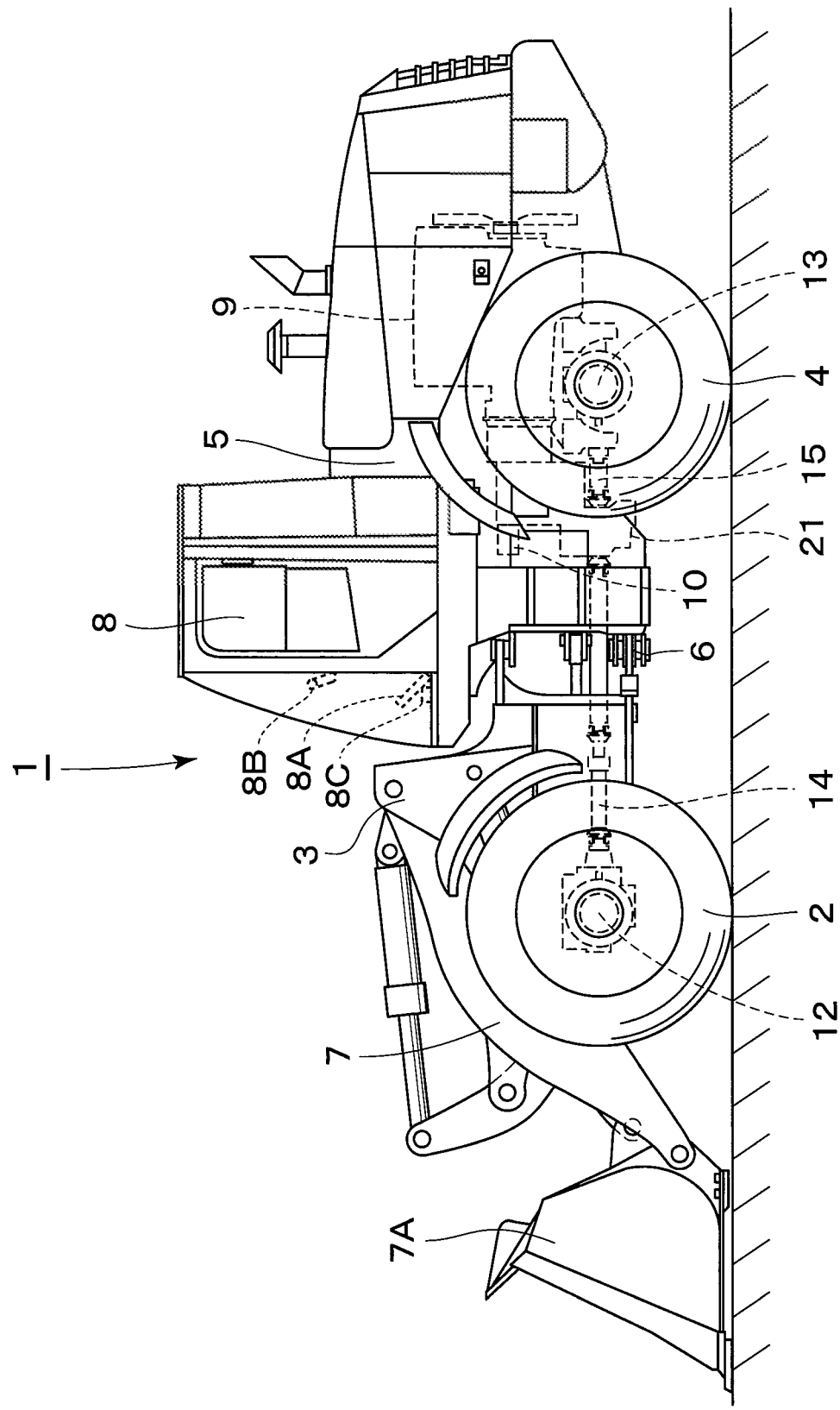
FIG. 1 is a left side view of a wheel loader on which a power transmission device for a vehicle is mounted according to an embodiment.

FIGS. 1 to 8 show a power transmission device for a vehicle according to embodiments of the present invention. In FIG. 1, a wheel loader 1 is representative example of a vehicle (working vehicle). The wheel loader 1 is configured as an articulated-type working vehicle in which a front vehicle body 3 provided with left and right front wheels 2 is connected to a rear vehicle body 5 provided with left and right rear wheels 4 to be capable of bending in the left-and-right direction. That is, the front vehicle body 3 and the rear vehicle body 5 configures a vehicle body of the wheel loader 1. A center hinge 6 and a steering cylinder (not shown) are arranged between the front vehicle body 3 and the rear vehicle body 5. The front vehicle body 3 and the rear vehicle body 5 bend in the right-and-left direction, with the center hinge 6 positioned centrally by extending and contracting the steering cylinder. This allows to perform the steering of the wheel loader 1 at the traveling.

A working mechanism 7 called also a cargo handling machine or a front working machine is disposed in the front vehicle body 3 of the wheel loader 1 to be capable of tilting/lifting thereto. The working mechanism 7 comprises a loader bucket 7A. On the other hand, a cab 8 that defines therein an operating room, an engine 9, a hydraulic pump 10, a transmission 21 as a speed-changing device and the like are arranged in the rear vehicle body 5 of the wheel loader 1. An accelerator pedal 8A as an operating member accelerating the vehicle and a forward-reverse switching lever 8B (hereinafter referred to as "FNR lever 8B") switching between forward and retreat of the vehicle and switching a shift stage are provided in the cab 8. An operator's seat, a steering wheel, a brake pedal, a switch for parking brake and the like are provided in the cab 8 (not shown).

An operating amount detector 8C detecting an operating amount θ of the accelerator pedal 8A is provided in the accelerator pedal 8A. An operator operates the FNR lever 8B to switch between forward and reverse of the wheel loader 1 and to switch a shift stage. The operator switches the FNR lever 8B to a forward position (F) to advance the wheel loader 1. The operator switches the FNR lever 8B to a reverse position (R) to retreat the wheel loader 1. The operator switches the FNR lever 8B to a neutral position (N) to continue the stop of the wheel loader 1 without allowing it to travel or to stop the vehicle at the traveling. The operator rotates the FNR lever 8B around a lever shaft when switching the shift stage.

The engine 9 is a power source (prime mover) for the wheel loader 1. The power source (prime mover) can be configured with one unit of the engine 9 as an internal combustion engine, besides may be configured with, for example, an engine and an electric motor or an electric motor unit. The hydraulic pump 10 is connected to the engine 9. The hydraulic pump 10 is a hydraulic power source for operating the working mechanism 7.

A front axle 12 extending in the left-and-right direction is disposed under the front vehicle body 3. The left and right front wheels 2 are attached to both ends of the front axle 12. On the other hand, a rear axle 13 extending in the right-and-left direction is disposed under the rear vehicle body 5. The left and right rear wheels 4 are mounted on both ends of the rear axle 13.

The front axle 12 is connected to a transmission 21 via a front propeller shaft 14. The rear axle 13 is connected to the transmission 21 via a rear propeller shaft 15. The transmission 21 changes (reduces) the rotation of the engine 9 to be transmitted to the front propeller shaft 14 and the rear propeller shaft 15. That is, the power from the engine 9 is transmitted to the transmission 21 connected to the engine 9.

Figure 2:
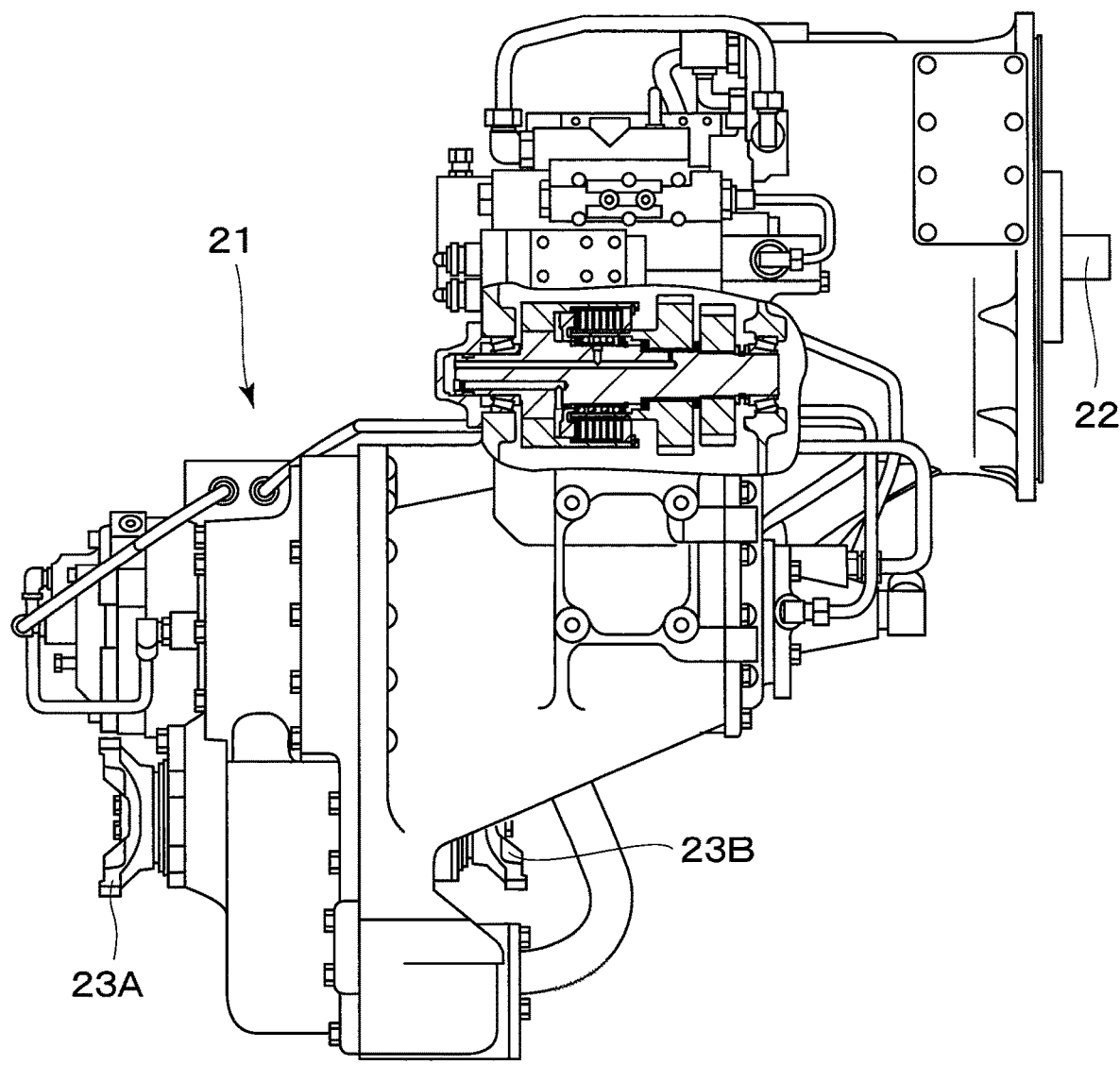
FIG. 2 is a partially broken side view showing a transmission (power transmission device for a vehicle) in FIG. 1.

The power from the engine 9 is transmitted from front and rear output shafts 23A, 23B of the transmission 21 to the front axle 12 and the rear axle 13 via the front propeller shaft 14 and the rear propeller shaft 15 after the transmission 21 controls the rotational speed and the rotating direction. That is, as shown in FIG. 2, the transmission 21 comprises an input shaft 22 connected to the engine 9, a front side output shaft 23A connected to the front propeller shaft 14, and a rear side output shaft 23B connected to the rear propeller shaft 15. The transmission 21 performs the switching of forward rotation and reverse rotation between the input shaft 22 and the output shafts 23A, 23B by switching a power transmission path in the transmission 21.

Figure 3:
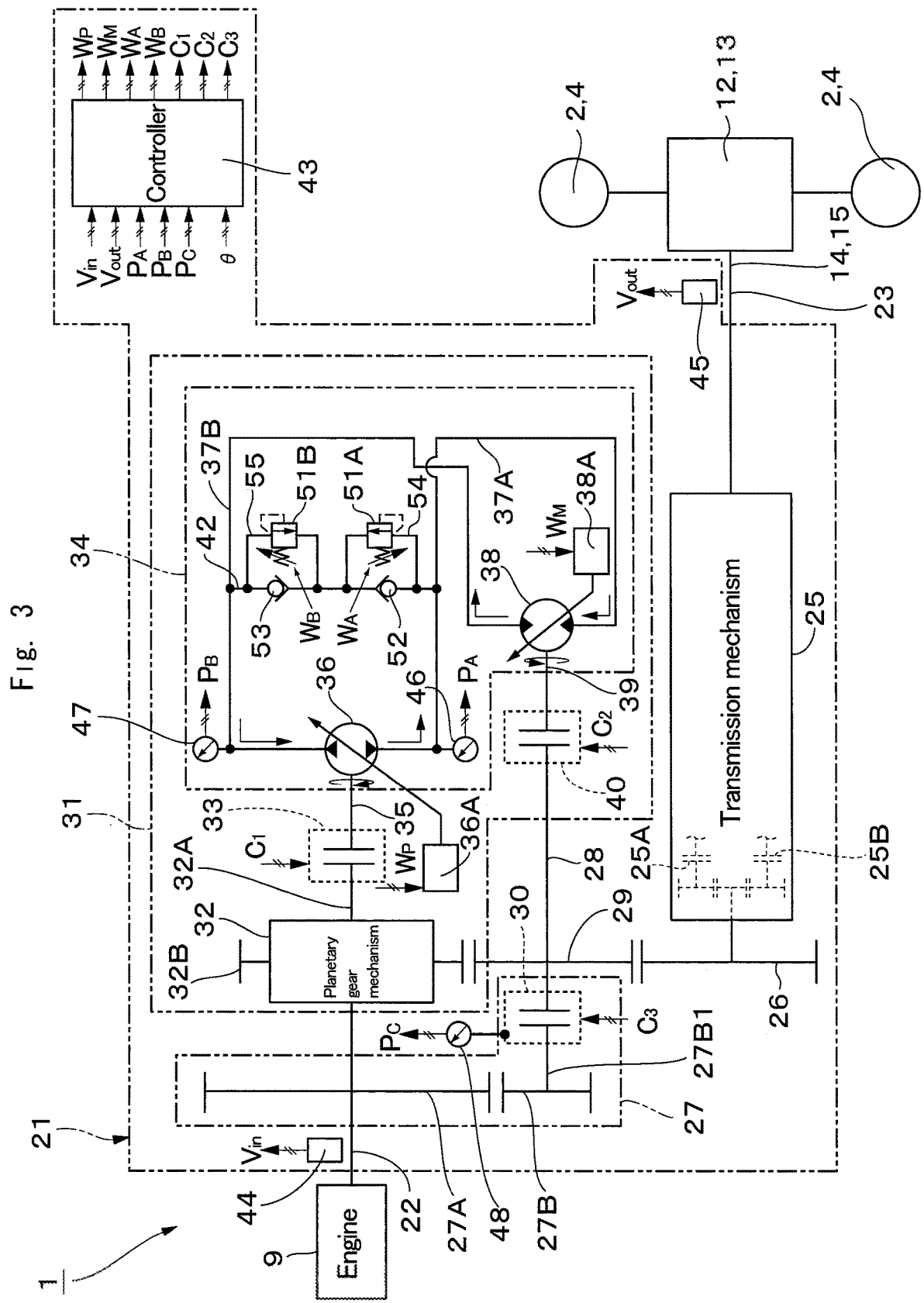
FIG. 3 is a configuration diagram showing power transmission paths of the wheel loader together with a controller.

Next, an explanation will be made of the transmission 21 according to an embodiment by referring to FIGS. 3 to 8, in addition to FIGS. 1 and 2. FIG. 3 schematically shows the output shaft 23 of the transmission 21 as a common output shaft 23 (=output shafts 23A, 23B) transmitting the power to both the front axle 12 and the rear axle 13 to avoid complexity of graphic configuration. That is, in FIG. 3, a configuration of dividing the power between the front side output shaft 23A and the rear side output shaft 23B via a center differential mechanism and the like, for example, is omitted.

A transmission 21 as a power transmission device for a vehicle comprises an input shaft 22, an output shaft 23, and a planetary continuously variable transmission mechanism 31 as a continuously variable transmission mechanism. Moreover, the transmission 21 comprises an idler gear 29 as an idler element, a transmission mechanism 25 as a stepped transmission mechanism (a multi-stage transmission mechanism), a direct connecting mechanism 27, and a transmission shaft 28. The transmission 21 further comprises a controller 43, a first pressure detector 46, a second pressure detector 47, a third pressure detector 48, a first speed detector 44, and a second speed detector 45.

The input shaft 22 is rotated by the engine 9, which is a prime mover mounted on a vehicle (wheel loader 1). That is, (a drive shaft of) the engine 9 is connected to the input shaft 22. On the other hand, the output shaft 23 outputs the rotation to the front axle 12 and/or the rear axle 13, which are traveling devices of the vehicle. That is, the power of the engine 9 is outputted from the output shaft 23 via the transmission 21 as a speed-changing device. The output shaft 23 outputs the rotation to the front wheels 2 and/or the rear wheels 4 via the front axle 12 and/or the rear axle 13 of the wheel loader 1.

The input power from the input shaft 22 to the transmission 21 is transmitted to the idler gear 29 via the planetary continuously variable transmission mechanism 31 or the direct connecting mechanism 27. The power transmitted to the idler gear 29 is outputted from the output shaft 23 through the transmission mechanism 25. The planetary continuously variable transmission mechanism 31 is disposed between the input shaft 22 and the output shaft 23. The planetary continuously variable transmission mechanism 31 changes the speed of a rotation on the input shaft 22-side and transmits the power to the output shaft 23-side. An input side of the planetary continuously variable transmission mechanism 31 is connected to the input shaft 22 provided with the input side gear 27A of the direct connecting mechanism 27. An output side of the planetary continuously variable transmission mechanism 31 is connected to the transmission shaft 28 provided with the idler gear 29.

The transmission mechanism 25 is disposed between the input shaft 22 and the output shaft 23 in series with the planetary continuously variable transmission mechanism 31 and the direct connecting mechanism 27. The transmission mechanism 25 also changes the speed of a rotation on the input shaft 22-side and transmits the power to the output shaft 23-side. In this case, the transmission mechanism 25 is disposed between an intermediate gear 26 meshing with the idler gear 29 and the output shaft 23. That is, an input side of the transmission mechanism 25 is connected to the intermediate gear 26. An output side of the transmission mechanism 25 is connected to the output shaft 23. The transmission mechanism 25 is configured as a multi-stage stepped transmission mechanism, for example.

The transmission mechanism 25 is configured to comprise a plurality of transmission shafts, a plurality of gears, and a plurality of clutches, for example. In this case, the transmission mechanism 25 can be configured as a transmission mechanism (DCT: Dual Clutch Transmission) including, for example, a forward clutch 25A to be connected when the wheel loader 1 is advanced and a reverse clutch 25B to be connected when the wheel loader 1 is retreated. Such a transmission mechanism 25 may be omitted. That is, the intermediate gear 26 and the output shaft 23 may directly be connected not via the transmission mechanism 25.

The direct connecting mechanism 27 transmits a rotation on the input shaft 22-side to the output shaft 23-side by bypassing the planetary continuously variable transmission mechanism 31. That is, the direct connecting mechanism 27 directly transmits the rotation of the input shaft 22 to the transmission mechanism 25 not via the planetary continuously variable transmission mechanism 31. The direct connecting mechanism 27 comprises an input side gear 27A connected to the input shaft 22, an output side gear 27B meshing with the input side gear 27A, a rotational shaft 27B1 disposed coaxially with the transmission shaft 28, and a direct connecting clutch 30. The rotation of the output side gear 27B is transmitted to the transmission shaft 28 via the direct connecting clutch 30. In an embodiment, the input side gear 27A is disposed on the input shaft 22. The output side gear 27B is disposed on the rotational shaft 27B1 disposed coaxially with the transmission shaft 28. The direct connecting clutch 30 is disposed between the rotational shaft 27B1 and the transmission shaft 28.

The transmission shaft 28 is an output shaft of the direct connecting mechanism 27 and also an output shaft of the planetary continuously variable transmission mechanism 31. In this case, the transmission shaft 28 is disposed coaxially with the rotational shaft 27B1 of the direct connecting mechanism 27 and a second rotational shaft 39 of the planetary continuously variable transmission mechanism 31. The transmission shaft 28 is connected to the rotational shaft 27B1 of the direct connecting mechanism 27 via the direct connecting clutch 30. The rotation of the output side gear 27B of the direct connecting mechanism 27 is transmitted to the transmission shaft 28 when the direct connecting clutch 30 is connected to the transmission shaft 28. The transmission shaft 28 is connected to a second hydraulic pump motor 38 of the planetary continuously variable transmission mechanism 31 via a second clutch 40. In a case where the second clutch 40 is connected, the rotation of the second hydraulic pump motor 38 of the planetary continuously variable transmission mechanism 31 is transmitted to the transmission shaft 28. Moreover, the transmission shaft 28 is connected to the planetary output gear 32B of the planetary continuously variable transmission mechanism 31 via the idler gear 29.

The idler gear 29 as an idler element is disposed on the transmission shaft 28. The idler gear 29 mechanically connects the output side of the planetary continuously variable transmission mechanism 31 and the output side of the direct connecting mechanism 27. The idler gear 29 meshes with the planetary output gear 32B of the planetary gear mechanism 32 which configures the planetary continuously variable transmission mechanism 31. The idler gear 29 meshes with the intermediate gear 26. The rotation of the idler gear 29 is transmitted to the transmission mechanism 25 via the intermediate gear 26. That is, the input power from the input shaft 22 of the transmission 21 is transmitted to the idler gear 29 via the planetary continuously variable transmission mechanism 31 or the direct connecting mechanism 27. The power transmitted to the idler gear 29 is outputted from the output shaft 23 via the transmission mechanism 25.

The direct connecting clutch 30 is provided within the direct connecting mechanism 27 which is disposed between the input shaft 22 and the idler gear 29. That is, the direct connecting clutch 30 is disposed between the rotational shaft 27B1 of the output side gear 27B within the direct connecting mechanism 27 and the transmission shaft 28 provided with the idler gear 29. The direct connecting clutch 30 is capable of switching between a "connecting state (fastening state)" where the transmission of a rotation (torque, rotational force, power) is performed between the direct connecting mechanism 27 (rotational shaft 27B1) and the idler gear 29 (transmission shaft 28) and a "blocking state (releasing state)" where the transmission of the rotation is cut off. In a case where the direct connecting clutch 30 is in the connecting state, the rotation of the output side gear 27B (rotational shaft 27B1) of the direct connecting mechanism 27 is transmitted to the idler gear 29 via the transmission shaft 28. In a case where the direct connecting clutch 30 is in the releasing state, the rotation of the output side gear 27B (rotational shaft 27B1) is not transmitted to the transmission shaft 28. The connection and release of the direct connecting clutch 30 are controlled based upon a command from the controller 43 (command signal $C_3$).

Next, an explanation will be made of the planetary continuously variable transmission mechanism 31.

The planetary continuously variable transmission mechanism 31 comprises the planetary gear mechanism 32, a first clutch 33, a hydrostatic continuously variable transmission mechanism 34, and the second clutch 40. The hydrostatic continuously variable transmission mechanism 34 comprises a first rotational shaft 35, a first hydraulic pump motor 36, a pair of main lines 37A, 37B (first main line 37A, second main line 37B), the second hydraulic pump motor 38, the second rotational shaft 39, variable relief valves 51A, 51B (a first variable relief valve 51A as a first relief valve and a second variable relief valve 51B as a second relief valve), and a connecting line 42.

The planetary gear mechanism 32 is connected to the input shaft 22 (the drive shaft of the engine 9) side. Specifically, the planetary gear mechanism 32 is connected to the input shaft 22. The planetary gear mechanism 32 is configured by single or multi-stage planetary gear device (not shown), a planetary output shaft 32A, and a planetary output gear 32B. The planetary gear device comprises a Sun gear, a ring gear, and a carrier supporting a planetary gear meshing with the Sun gear and the ring gear, for example. For example, the input shaft 22 is connected to any member(s) of the Sun gear, the ring gear and the carrier. The planetary output shaft 32A is connected to any member(s) of the Sun gear, the ring gear and the carrier to which the input shaft 22 is not connected. The planetary output gear 32B is connected to the remaining member(s) of the Sun gear, the ring gear and the carrier. The planetary output shaft 32A is connected to the first rotational shaft 35 of the hydrostatic continuously variable transmission mechanism 34 (first hydraulic pump motor 36) via the first clutch 33. The rotation of the planetary output shaft 32A is transmitted to the first rotational shaft 35 of the hydrostatic continuously variable transmission mechanism 34 (first hydraulic pump motor 36) via the first clutch 33. The planetary output gear 32B meshes with the idler gear 29. The rotation of the planetary output gear 32B is transmitted to the idler gear 29.

The first clutch 33 is disposed on the output side of the planetary gear mechanism 32. That is, the first clutch 33 is disposed between the planetary output shaft 32A of the planetary gear mechanism 32 and the first rotational shaft 35 (first hydraulic pump motor 36) of the hydrostatic continuously variable transmission mechanism 34. The first clutch 33 is capable of switching between a "connecting state (fastening state)" where the transmission of a rotation is performed between the planetary gear mechanism 32 (planetary output shaft 32A) and the first hydraulic pump motor 36 (first rotational shaft 35) of the hydrostatic continuously variable transmission mechanism 34 and a "blocking state (releasing state)" where the transmission of the rotation is cut off. The rotation of the planetary output shaft 32A of the planetary gear mechanism 32 is transmitted to the first hydraulic pump motor 36 via the first rotational shaft 35 of the hydrostatic continuously variable transmission mechanism 34 when the first clutch 33 is in the connecting state, for example. The rotation of the planetary output shaft 32A is not transmitted to the first rotational shaft 35 when the first clutch 33 is in the releasing state, for example. The connection and release of the first clutch 33 are controlled based upon a command from the controller 43 (command signal $C_1$).

The first rotational shaft 35 of the hydrostatic continuously variable transmission mechanism 34 corresponds to an input shaft of the hydrostatic continuously variable transmission mechanism 34. The first rotational shaft 35 is connected to a rotational shaft of the first hydraulic pump motor 36, and alternatively corresponds to the rotational shaft of the first hydraulic pump motor 36. The first hydraulic pump motor 36 is connected to the output side of the planetary gear mechanism 32, or the planetary output shaft 32A of the planetary gear mechanism 32 via the first clutch 33.

The first hydraulic pump motor 36 is disposed on the output side of the planetary gear mechanism 32, or on the input shaft 22 side. The first hydraulic pump motor 36 circulates pressurized oil in the pair of main lines 37A, 37B by rotatively driving the first rotational shaft 35. The first hydraulic pump motor 36 is configured by a variable displacement swash plate type of a hydraulic pump motor, for example. The first hydraulic pump motor 36 is a hydraulic unit (hydraulic pump or hydraulic motor) which functions as a hydraulic pump when the power is inputted from the first rotational shaft 35 and functions as a hydraulic motor when the power is outputted to the first rotational shaft 35. The first hydraulic pump motor 36 includes a regulator 36A controlling the pump capacity (motor capacity). The regulator 36A of the first hydraulic pump motor 36 is variably controlled based upon a command from the controller 43 (command signal $W_p$). The pair of main lines 37A, 37B connect a pair of supply and discharge ports of the first hydraulic pump motor 36 and a pair of supply and discharge ports of the second hydraulic pump motor 38.

The second hydraulic pump motor 38 is connected to the first hydraulic pump motor 36 via the pair of main lines 37A, 37B composed of the first main line 37A and the second main line 37B. The second hydraulic pump motor 38 is rotated by pressurized oil fed from the first hydraulic pump motor 36. The second hydraulic pump motor 38 is configured by a variable displacement swash plate type of a hydraulic pump motor, for example. The second hydraulic pump motor 38 is a hydraulic unit (hydraulic motor or hydraulic pump) which functions as a hydraulic motor when the power is outputted to the second rotational shaft 39 and functions as a hydraulic pump when the power is inputted from the second rotational shaft 39. The second hydraulic pump motor 38 includes a regulator 38A controlling the motor capacity (pump capacity). The regulator 38A of the second hydraulic pump motor 38 is variably controlled based upon a command from the controller 43 (command signal $W_M$). The second rotational shaft 39 of the hydrostatic continuously variable transmission mechanism 34 corresponds to an output shaft of the hydrostatic continuously variable transmission mechanism 34. The second rotational shaft 39 is connected to a rotational shaft of the second hydraulic pump motor 38. Alternatively, the second rotational shaft 39 corresponds to the rotational shaft of the second hydraulic pump motor 38.

The second clutch 40 is disposed between the second hydraulic pump motor 38 and the idler gear 29. As a result, the second hydraulic pump motor 38 is connected to the idler gear 29 via the second clutch 40. In this case, the second clutch 40 is disposed between the second rotational shaft 39 of the hydrostatic continuously variable transmission mechanism 34 and the transmission shaft 28 provided with the idler gear 29. The second clutch 40 is capable of switching between a "connecting state (fastening state)" where transmission of a rotation is performed between the idler gear 29 (transmission shaft 28) and the second hydraulic pump motor 38 (second rotational shaft 39) of the hydrostatic continuously variable transmission mechanism 34 and a "blocking state (releasing state)" where transmission of the rotation is cut off. The rotation of the second rotational shaft 39 of the hydrostatic continuously variable transmission mechanism 34 (=rotation of the second hydraulic pump motor 38) is transmitted to the idler gear 29 via the transmission shaft 28 when the second clutch 40 is in the connecting state, for example. The rotation of the second rotational shaft 39 is not transmitted to the transmission shaft 28 when the second clutch 40 is in the releasing state, for example. The connection and release of the second clutch 40 are controlled based upon a command from the controller 43 (command signal $C_2$).

In an embodiment, the input power from the input shaft 22 of the transmission 21 can optionally be transmitted to the transmission mechanism 25 via the planetary continuously variable transmission mechanism 31, or transmitted to the transmission mechanism 25 via the direct connecting mechanism 27. As a result, if a planetary continuously variable transmission mechanism 31 is suitably operated, for example, if high load conditions for excavating earth and sand which need high torques are required, such a planetary continuously variable transmission mechanism 31 can be used. On the other hand, in a case where the direct connecting mechanism 27 suitably changes the speed, for example, low load conditions for a vehicle to travel at a constant speed for a long distance in a working site are required, the power can be transmitted via the direct connecting mechanism 27.

The direct connecting clutch 30 is released to connect the first clutch 33 and the second clutch 40 in a case where the power is transmitted to the transmission mechanism 25 via the planetary continuously variable transmission mechanism 31. In this case, the power may be distributed to the transmission mechanism 25-side via the planetary gear mechanism 32 and the hydrostatic continuously variable transmission mechanism 34, or the power may be transmitted to the transmission mechanism 25-side without transmitting the power to the hydrostatic continuously variable transmission mechanism 34 by setting the rotational speed of the first hydraulic pump motor 36 at 0.

The state of releasing the direct connecting clutch 30, connecting the first clutch 33 and the second clutch 40, transmitting the power to the hydrostatic continuously variable transmission mechanism 34 and transmitting the power to the transmission mechanism 25-side is referred to as the state of continuously variable transmission. On the other hand, the state of releasing the direct connecting clutch 30, connecting the first clutch 33 and the second clutch 40, transmitting no power to the hydrostatic continuously variable transmission mechanism 34 but transmitting the power to the transmission mechanism 25-side is referred to as "internal direct connection". During the internal direct connection, the tilting (discharged capacity) of the first hydraulic pump motor 36 is increased above a predetermined value and the tilting of the second hydraulic pump motor 38 is set in a neutral state to allow for braking in the hydrostatic continuously variable transmission mechanism 34 and setting the rotational speed of the first hydraulic pump motor 36 at 0.

As a result, the power from the engine 9 in the state of internal direct connection is transmitted to the transmission mechanism 25. In fact, the rotational speed of the first hydraulic pump motor 36 never reaches 0 because the first hydraulic pump motor 36 and the second hydraulic pump motor 38 are leaking oil, but most of the power from the engine 9 can be distributed to the transmission mechanism 25. In the state of internal direct connection, the second clutch 40 may not be connected. On the other hand, in a case where the power is transmitted to the transmission mechanism 25 via the direct connecting mechanism 27, the direct connecting clutch 30 is connected to release the first clutch 33 and the second clutch 40. The direct connecting clutch 30, the first clutch 33 and the second clutch 40 may each be adopted to a wet multiple-disk clutch or a synchromesh mechanism clutch.

In an embodiment, the hydrostatic continuously variable transmission mechanism 34 comprises variable relief valves 51A, 51B capable of changing the set pressure (relief set pressure, relief start pressure) and check valves 52, 53 allowing a pressurized oil to circulate in one direction and preventing the pressurized oil from circulating in the opposite direction. That is, the first main line 37A and the second main line 37B of the hydrostatic continuously variable transmission mechanism 34 are connected by the connecting line 42. Herein, the first hydraulic pump motor 36 and the second hydraulic pump motor 38 transmit the power by allowing hydraulic oil to circulate via the pair of main lines 37A, 37B disposed therebetween. The pressure of the first main line 37A is higher than the pressure of the second main line 37B when the speed of a rotation on the input shaft 22 side is changed to transmit the power to the output shaft 23 side. In addition, the pressure of the second main line 37B is higher than the pressure of the first main line 37A when the speed of a rotation on the output shaft 23 side is changed to transmit the power to the input shaft 22 side. A pair of check valves 52, 53 are provided in the connecting line 42 connecting the first main line 37A and the second main line 37B.

The one check valve 52 (hereinafter also referred to as "first check valve 52") allows a pressurized oil to circulate from the second main line 37B-side to the first main line 37A-side and prevents the pressurized oil from circulating in the opposite direction. That is, the first check valve 52 allows the flow of a hydraulic oil from the second main line 37B to the first main line 37A to be in a communicating state and the flow of a hydraulic oil from the first main line 37A to the second main line 37B to be in a blocking state. The other check valve 53 (hereinafter also referred to as "second check valve 53") allows a pressurized oil to circulate from the first main line 37A-side to the second main line 37B-side and prevents the pressurized oil from circulating in the opposite direction. That is, the second check valve 53 allows the flow of a hydraulic oil from the first main line 37A to the second main line 37B to be in a communicating state and the flow of a hydraulic oil from the second main line 37B to the first main line 37A to be in a blocking state.

Bypass lines 54, 55 bypassing the respective check valves 52, 53 are connected to the connecting line 42. The first bypass line 54 is branched off from the connecting line 42 and connected to the connecting line 42 by bypassing the first check valve 52. The second bypass line 55 is branched off from the connecting line 42 and connected to the connecting line 42 by bypassing the second check valve 53. The variable relief valves 51A, 51B are disposed on the way of the Bypass lines 54, 55.

That is, the first relief valve 51A is disposed on the way of the first bypass line 54. The first variable relief valve 51A allows the flow of a hydraulic oil from the first main line 37A to the second main line 37B to be in a blocking state in a case the pressure of the first main line 37A is a predetermined pressure (first pressure, fourth pressure) or less and to be in a communicating state in a case the pressure of the first main line 37A exceeds the predetermined pressure (first pressure, fourth pressure). The second variable relief valve 51B is disposed on the way of the second bypass line 55. The second variable relief valve 51B allows the flow of a hydraulic oil from the second main line 37B to the first main line 37A to be in a blocking state in a case the pressure of the second main line 37B is a predetermined pressure (first pressure, second pressure, third pressure) or less and to be in a communicating state in a case the pressure of the second main line 37B exceeds the predetermined pressure (first pressure, second pressure, third pressure). The variable relief valves 51A, 51B are configured by an electrically-operated relief valve (e.g., electromagnetic relief valve) in which the valve opening pressure (relief pressure) is changed based upon command signals (command signals $W_A$, $W_B$) from a controller 43. That is, set values of the variable relief valves 51A, 51B are changed based upon command signals (command signals $W_A$, $W_B$) from the controller 43.

The first speed detector 44 is disposed on the input shaft 22 of the transmission 21. The first speed detector 44 is a rotation detection sensor detecting the rotational speed and the rotating direction of the input shaft 22. The rotational speed of the input shaft 22 corresponds to the rotational speed of the engine 9 (hereafter referred to as "engine rotational speed Vin"). The first speed detector 44 outputs a detection signal corresponding to the engine rotational speed Vin to the controller 43. The second speed detector 45 is disposed on the output shaft 23 of the transmission 21. The second speed detector 45 is a rotation detection sensor detecting the rotational speed of the output shaft 23 (hereafter referred to as "output rotational speed Vout") and the rotating direction. The output rotational speed Vout corresponds to the vehicle speed. The second speed detector 45 outputs a detection signal corresponding to the output rotational speed Vout and the rotating direction to the controller 43.

The first pressure detector 46 is disposed in the first main line 37A. The first pressure detector 46 is a pressure sensor detecting the fluid pressure (pressure) of the first main line 37A. The first pressure detector 46 outputs a detection signal corresponding to the fluid pressure $P_A$ of the first main line 37A to the controller 43. The second pressure detector 47 is provided in the second main line 37B. The second pressure detector 47 is a pressure sensor detecting the fluid pressure (pressure) of the second main line 37B. The second pressure detector 47 outputs a detection signal corresponding to the fluid pressure $P_B$ of the second main line 37B to the controller 43.

The third pressure detector 48 is disposed on the direct connecting clutch 30. The third pressure detector 48 is a pressure sensor detecting the clutch pressure (pressure) of the direct connecting clutch 30. The third pressure detector 48 outputs a detection signal corresponding to the clutch pressure $P_C$ of the direct connecting clutch 30 to the controller 43. The operating amount detector 8C (see FIG. 1) is disposed in the accelerator pedal 8A. The operating amount detector 8C is an operating amount detection sensor detecting an operating amount θ of the accelerator pedal 8A. The operating amount detector 8C outputs a detection signal corresponding to the operating amount θ of the accelerator pedal 8A to the controller 43.

Next, an explanation will be made of the controller 43 controlling the switching of power transmission paths of the transmission 21 and changes in set pressures of variable relief valves 51A, 51B.

An input side of the controller 43 is connected to the first speed detector 44, the second speed detector 45, the first pressure detector 46, the second pressure detector 47, the third pressure detector 48, and the operating amount detector 8C. An output side of the controller 43 is connected to the direct connecting clutch 30, the first clutch 33, the second clutch 40, the regulator 36A of the first hydraulic pump motor 36 of the planetary continuously variable transmission mechanism 31, the regulator 38A of the second hydraulic pump motor 38 of the planetary continuously variable transmission mechanism 31, and the variable relief valves 51A, 51B.

The controller 43 is configured to comprise a microcomputer including a central processing unit (CPU), a memory and the like. The memory stores a processing program used in processing a switching control of power transmission paths of the transmission 21 and a processing program and the like used in control processing for changing set pressures of the variable relief valves 51A, 51B. That is, the controller 43 adjusts the pump capacity and the motor capacity, and controls connection and release of the direct connecting clutch 30, the first clutch 33 and the second clutch 40 and set pressures of the variable relief valves 51A, 51B.

In the controller 43, an engine rotational speed Vin is inputted from the first speed detector 44, an output rotational speed Vout is inputted from the second speed detector 45, fluid pressures $P_A$, $P_B$ and a clutch pressure $P_C$ are inputted from the first pressure detector 46, the second pressure detector 47 and the third pressure detector 48, and an operating amount θ is inputted from the operating amount detector 8C. The controller 43, based upon these inputs, calculates commands for the clutches 30, 33, 40 (clutch command), commands for the variable relief valves 51A, 51B (relief pressure command), a command for the regulator 36A of the first hydraulic pump motor 36 (pump command, motor command) and a command for the regulator 38A of the second hydraulic pump motor 38 (motor command, pump command).

The controller 43 outputs relief pressure command signals $W_A$, $W_B$ to the variable relief valves 51A, 51B, based upon the results of operations. In this case, the controller outputs the signal $W_A$ to the first variable relief valve 51A, and the signal $W_B$ to the second variable relief valve 51B. In addition, the controller 43 outputs ON (connect)/OFF (release) signals $C_1$, $C_2$, $C_3$ to the clutches 30, 33, 40, based upon the results of operations. In this case, the signal $C_1$ is outputted to the first clutch 33, the signal $C_2$ is outputted to the second clutch 40, and the signal $C_3$ is outputted to the direct connecting clutch 30.

Further, the controller 43 outputs swash plate or inclined shaft tilting command signals $W_P$, $W_M$ to the regulator 36A of the first hydraulic pump motor 36 and the regulator 38A of the second hydraulic pump motor 38, based upon the results of operations. In this case, the tilting command signal $W_P$ is outputted to the regulator 36A of the first hydraulic pump motor 36, and the tilting command signal $W_M$ is outputted to the regulator 38A of the second hydraulic pump motor 38. The hydraulic pump motors 36, 38 in the hydrostatic continuously variable transmission mechanism 34 are of variable displacement type. The hydraulic pump motors 36, 38 change the discharged capacity by changing the tilting angle of swash plate or inclined shaft. The hydraulic pump motors 36, 38 may be single tilting or both tilting.

In any case, the controller 43 includes an input part (reception part), a calculating part, a memory part and an output part. The controller 43 "connects and releases the first clutch 33", "operates the regulator 36A of the first hydraulic pump motor 36 (performs tilting adjustment)", "operates the regulator 38A of the second hydraulic pump motor 38 (performs tilting adjustment)", "connects and releases the second clutch 40", "connects and releases the direct connecting clutch 30", and "changes set pressures of the variable relief valves 51A, 51B". These controls are achieved by allowing a processor of the controller 43 (calculating part) to perform arithmetic processing, based upon a program stored at the memory part of the controller 43 (e.g., nonvolatile memory).

Nevertheless, since the above-described conventional technology provides the effect of a ride control device to suppress vibration, which is unfortunately restricted by the capacity of an accumulator, the vibration of a working vehicle cannot sufficiently be suppressed. In addition, the damper effect of an accumulator makes the operation of the front working machine unstable, resulting in a deteriorated positioning precision or lower operability of the front working machine. On the other hand, in an embodiment, the vibration of a traveling vehicle is suppressed without using an accumulator. In this case, in an embodiment, the vibration of a traveling vehicle is suppressed by the transmission 21. The operation and action of the transmission 21 capable of suppressing the vibration of a traveling vehicle will be described with reference to FIGS. 3 to 8.

The controller 43 determines whether or not the wheel loader 1 is traveling, based upon information corresponding to the state of the wheel loader 1 detected by an in-vehicle sensor. As one example, the controller 43 determines whether or not the FNR lever 8B is at an F position or an R position. The controller 43 determines that the wheel loader 1 is traveling when the FNR lever 8B is at the F position or the R position. Other conditions may be applied in this determination.

The controller 43 sets vibration suppression control by the transmission 21 at OFF state when the controller determines that the wheel loader 1 is being stopped. On the other hand, the controller 43 sets vibration suppression control by the transmission 21 at ON state when the controller determines that the wheel loader 1 is traveling. As described above, the transmission 21 is configured to allow the control of the controller 43 to switch between a vibration suppression control OFF state and a vibration suppression control ON state according to a traveling mode of the wheel loader 1.

In the "vibration suppression control OFF state", the relief start pressure of the variable relief valves 51A, 51B remains a high value (e.g., first set pressure P1). That is, in the "vibration suppression control OFF state", a higher relief start pressure of the variable relief valves 51A, 51B does not allow the Bypass lines 54, 55 to be in a communicating state. Thus, the state can achieve power transmission from the first hydraulic pump motor 36 to the second hydraulic pump motor 38, and also from the second hydraulic pump motor 38 to the first hydraulic pump motor 36. The first set pressure P1 can be set as a maximum relief pressure, which can be changed at the variable relief valves 51A, 51B, for example.

The transmission 21 switches from the "vibration suppression control OFF state" to the "vibration suppression control ON state" (at the time t0 in FIGS. 4 to 7) when the vehicle travels in a forward direction in the continuously variable transmission state (that is, when the FNR lever 8B is switched to F). The controller 43 sets the relief start pressure of the second variable relief valve 51B at a low value (for example, the second set pressure P2). At this time, the relief start pressure of the first variable relief valve 51A is a first set pressure P1. The accelerator pedal 8A is operated at the time t0 to start traveling of the vehicle. The second set pressure P2 can be set as a minimum relief pressure, which can be changed at the second variable relief valve 51B, for example.

Figure 4:
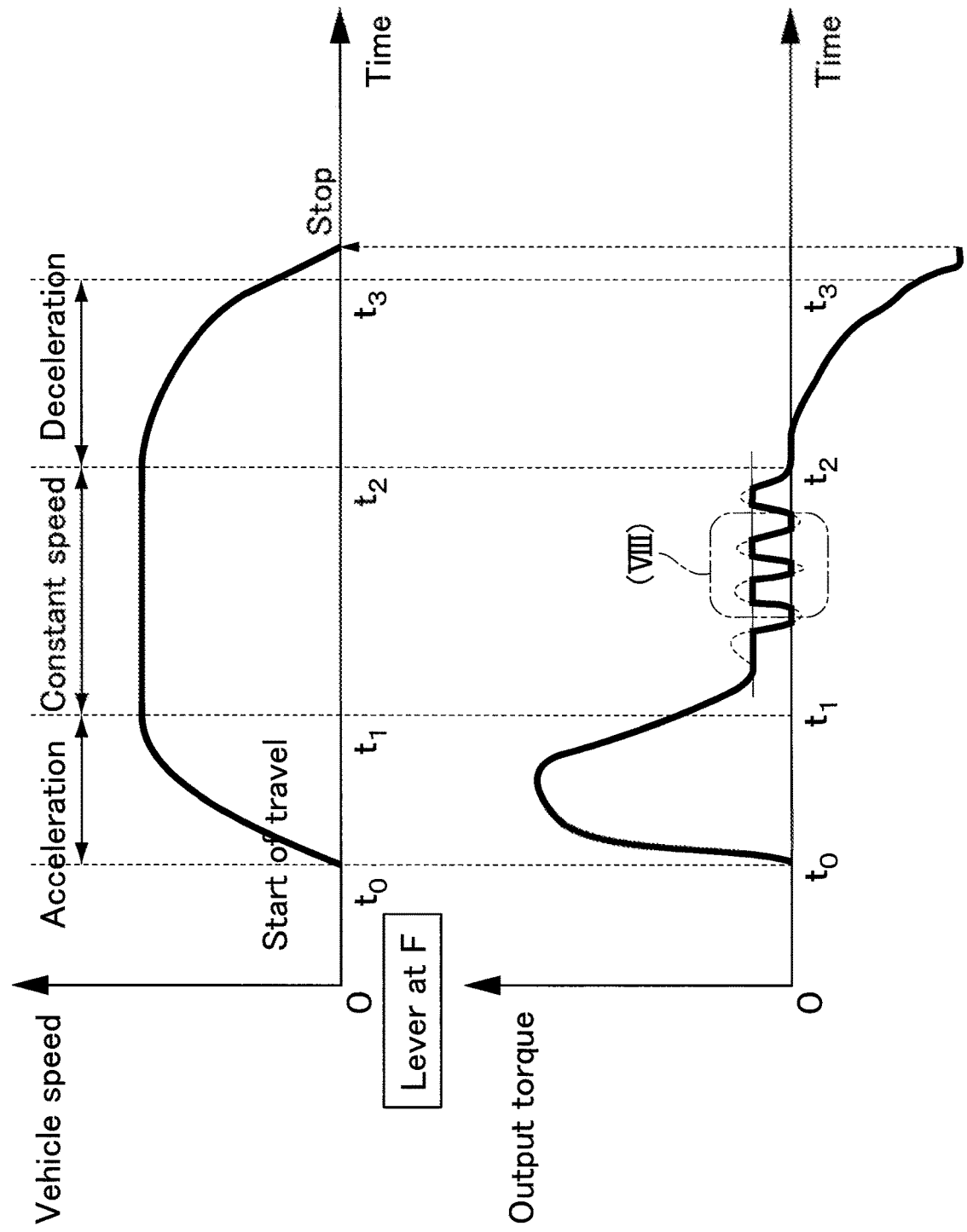
FIG. 4 is a characteristic diagram showing one example of time variations of a vehicle speed and an output torque.
Figure 5:
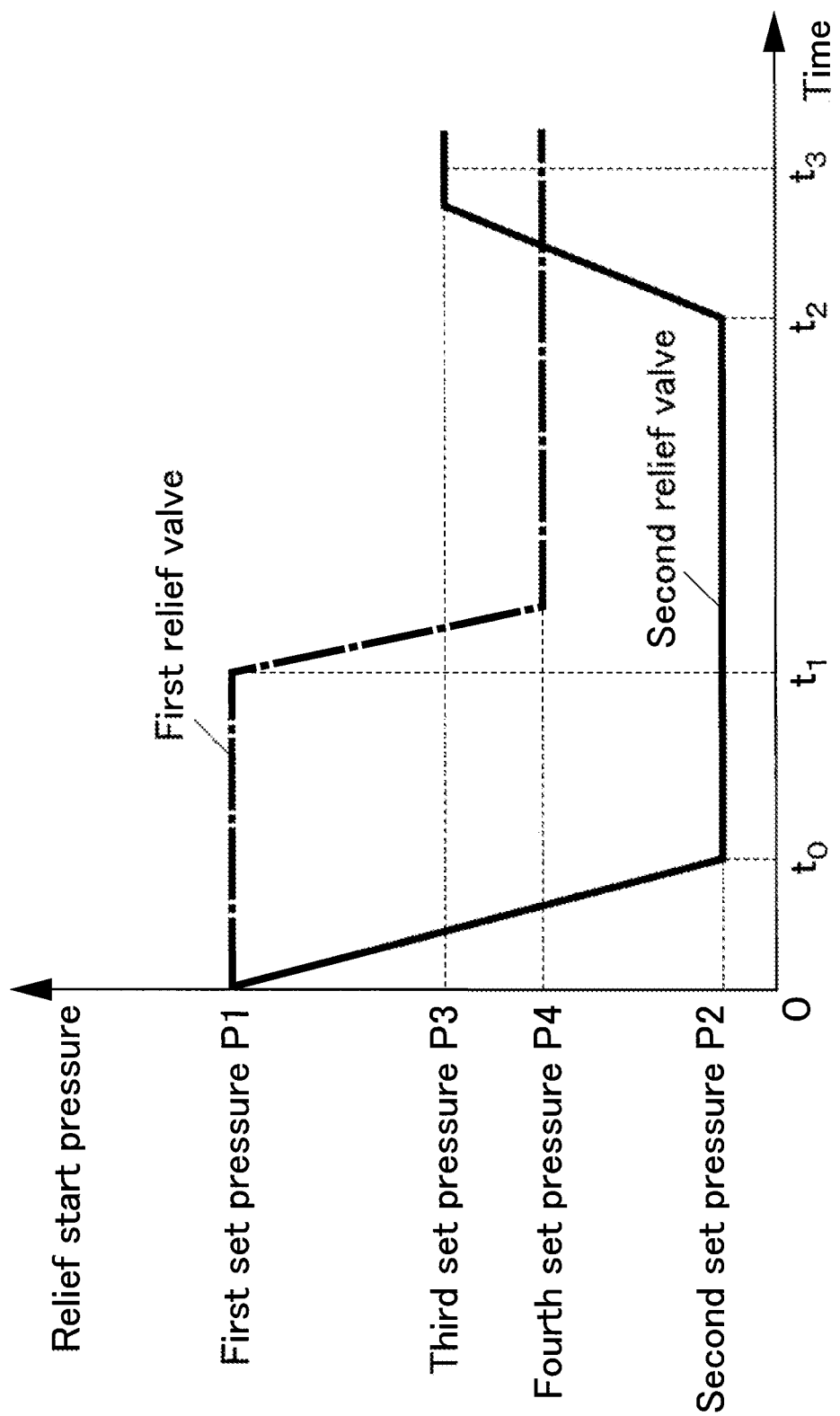
FIG. 5 is a characteristic diagram showing one example of time variations of a relief start pressure.
Figure 6:
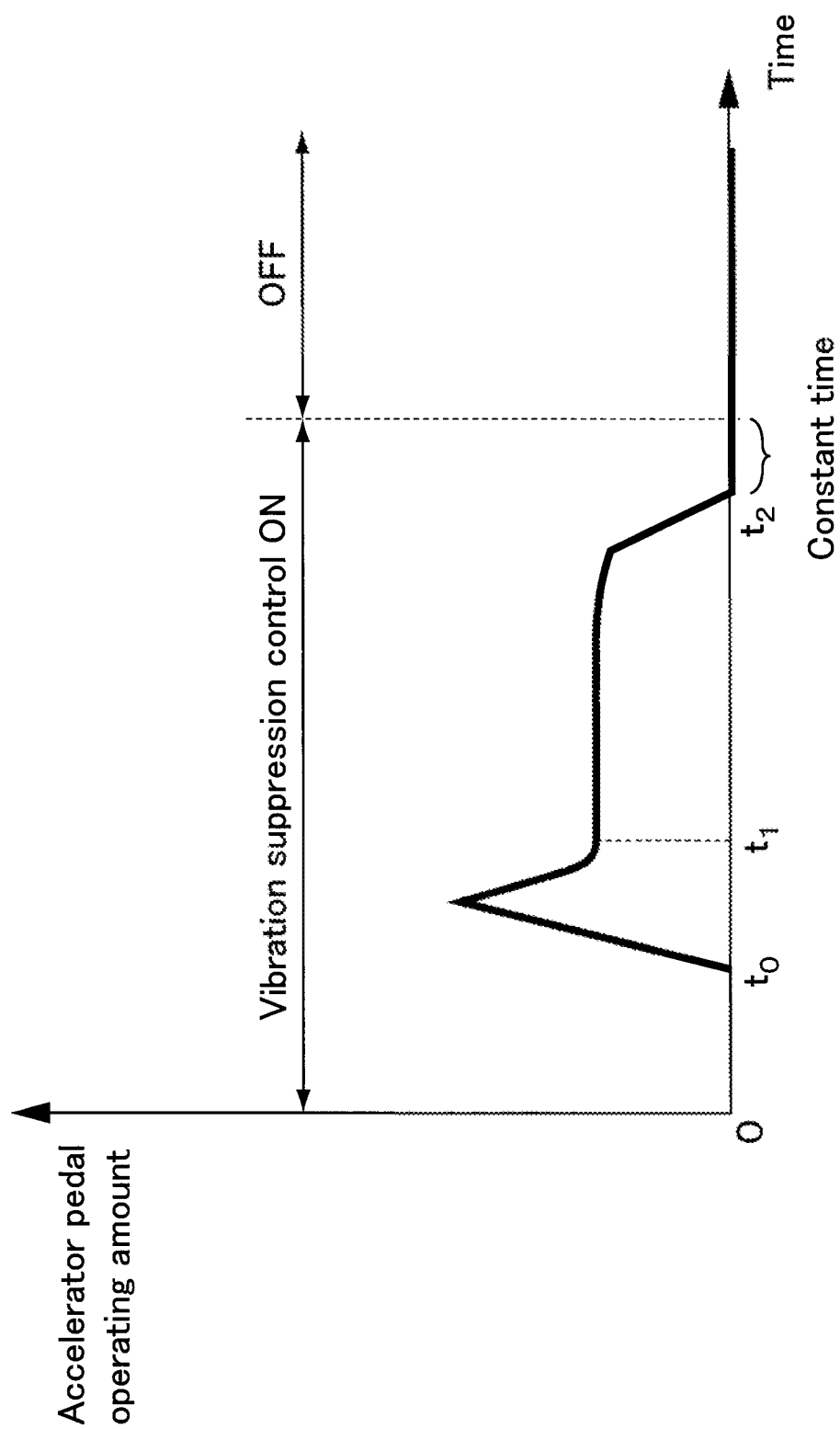
FIG. 6 is a characteristic diagram showing one example of time variations of an accelerator pedal operating amount.
Figure 7:
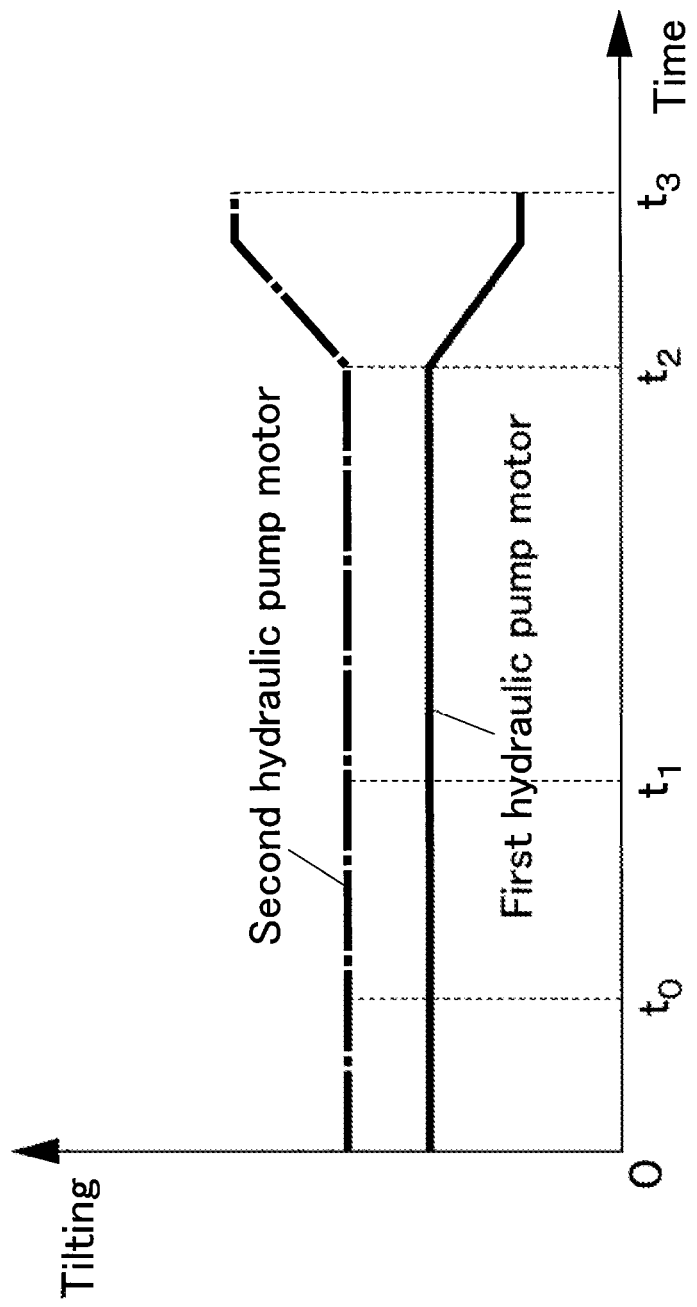
FIG. 7 is a characteristic diagram showing one example of time variations of a tilting amount of a hydraulic pump motor.

An operator raises an operating amount (command signal θ) by stepping on the accelerator pedal 8A until a target vehicle speed is reached. At this time, the relief start pressure of the first variable relief valve 51A remains the first set pressure P1. Thus, the power is transmitted from the first hydraulic pump motor 36 to the second hydraulic pump motor 38. As shown in FIGS. 4 and 6, the vehicle speed rises according to the operating amount of the accelerator pedal 8A. When the vehicle speed reaches an operator's target vehicle speed (time t1 in FIGS. 4 to 7), the operator keeps constant the operating amount of the accelerator pedal 8A so as to decrease the operating amount of the accelerator pedal 8A and maintain the vehicle speed. The operating amount of the accelerator pedal 8A increases as the vehicle speed of the wheel loader 1 rises.

An explanation will be made of the "vibration suppression control OFF state" in a section from a time t1 to a time t2 when a vehicle travels at a constant speed. In this case, as shown in broke line in FIG. 8, the output torque of the transmission 21 (hereinafter also referred to as "transmission output torque") varies. That is, in a continuously variable transmission state, the "power acting in a direction of decreasing the vehicle speed" inputted from wheels 2, 4 is transmitted to the second hydraulic pump motor 38 via the idler gear 29. At this time, the rotational shaft of the second hydraulic pump motor 38 (=second rotational shaft 39) is rotated counterclockwise relative to the second clutch 40 side, and the "power acting in a direction of decreasing the vehicle speed" acts on the rotational shaft of the second hydraulic pump motor 38 (=second rotational shaft 39). The hydraulic oil (hydraulic fluid) discharged from the second hydraulic pump motor 38 flows into the first hydraulic pump motor 36 via the second main line 37B. The power is transmitted from the second hydraulic pump motor 38 to the first hydraulic pump motor 36, and absorbed into the engine 9 via the planetary gear mechanism 32. This power absorption generates a transmission output torque (a negative output torque in FIG. 8) in an unintended direction (a direction of decreasing the vehicle speed).

Figure 8:
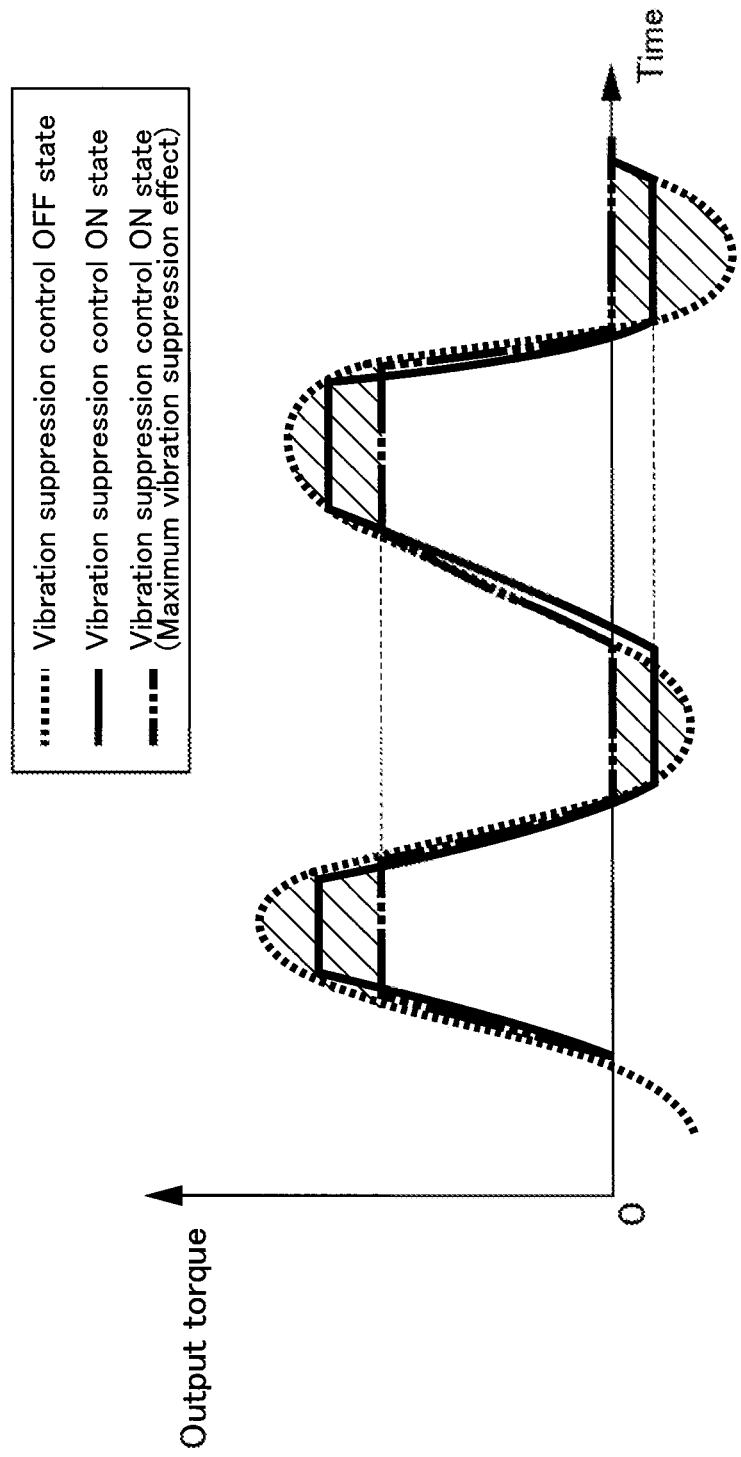
FIG. 8 is a characteristic diagram of an output torque corresponding to a portion (VIII) in FIG. 4.

On the other hand, in the "vibration suppression control ON state", the relief start pressure of the second variable relief valve 51B is set at the second set pressure P2, which is lower than the first set pressure P1. As a result, even if a high-pressure hydraulic oil is discharged from the second hydraulic pump motor 38, the pressure of the second main line 37B is a second set pressure P2. Thus, in the "vibration suppression control ON state", the rate of the "power acting in a direction of decreasing the vehicle speed" transmitted to the engine 9 can be reduced more than in the "vibration suppression control OFF state". Consequently, the brake torque can be reduced, and the transmission output torque in an unintended direction (direction of decreasing the vehicle speed) can be lowered. That is, as shown in solid line or two-dot chain line in FIG. 8, compared to the case shown in broken line, the transmission output torque (negative output torque) in an unintended direction (direction of decreasing the vehicle speed) can be reduced (a negative shaded area can be removed).

In addition, the controller 43 reads the vehicle speed from the operating amount of the accelerator pedal 8A kept constant at the time t1 to calculate the transmission output torque required for its vehicle speed. The transmission output torque is determined by a differential pressure between the first main line 37A and the second main line 37B when the tilting angle of the first hydraulic pump motor 36 and the tilting angle of the second hydraulic pump motor 38 are constant. The controller 43 adjusts the value of the first main line 37A (pressure) by lowering the relief start pressure of the first variable relief valve 51A (e.g., fourth set pressure P4) so as to acquire the transmission output torque as calculated. As a result, the pressure of the first main line 37A is maintained at the relief start pressure (fourth set pressure P4) of the first variable relief valve 51A such that the transmission output torque does not rise more than necessary.

The "power acting in a direction of increasing the vehicle speed" inputted from the wheels 2, 4 is transmitted to the idler gear 29. At this time, the rotational shaft of the second hydraulic pump motor 38 (=second rotational shaft 39) is rotated counterclockwise relative to the second clutch 40 side, and the "power acting in a direction of increasing the vehicle speed" acts on the rotational shaft of the second hydraulic pump motor 38 (=second rotational shaft 39). That is, the rotational shaft of the second hydraulic pump motor 38 (=second rotational shaft 39) is dragged by the idler gear 29 to allow the "power acting in a direction of increasing the vehicle speed" to act on the rotational shaft of the second hydraulic pump motor 38 (=second rotational shaft 39) to increase the output torque of the second hydraulic pump motor 38. However, since the relief start pressure of the first variable relief valve 51A is set at a fourth set pressure P4, the differential pressure between the first main line 37A and the second main line 37B will not rise. Thus, the transmission output torque does not rise, which allows the transmission output torque in an intended direction (direction of increasing the vehicle speed) to be restricted. That is, as shown in solid line or two-dot chain line in FIG. 8, compared to the case shown in broken line, the transmission output torque (positive-side output torque) in an intended direction (direction of increasing the vehicle speed) can be restricted (a positive-side shaded area can be removed).

Herein, the transmission output torque can be controlled even by controlling the tilting angle of the first hydraulic pump motor 36 or the tilting angle of the second hydraulic pump motor 38. However, in general, the variable relief valves 51A, 51B are more excellent in responsiveness than the hydraulic pump motors 36, 38. Thus, in an embodiment, the variable relief valves 51A, 51B are preferentially controlled.

Herein, the transmission output torque may be an output torque calculated by averaging the output torques. The transmission output torque can be calculated, based upon measurements from pressure gauges (first pressure detector 46, second pressure detector 47) mounted in the first main line 37A and the second main line 37B, respectively, for example. In addition, the transmission output torque may be calculated, based upon measurements of the angle of rotation (pitch angle), rotational speed, rotational acceleration, or rotational jerk of the wheel loader 1 with the horizontal axis (e.g., pitch axis) perpendicular to a traveling direction of the wheel loader 1 as a rotational center. In other words, the transmission output torque may be calculated, based upon a forward inclined posture of the vehicle body when decelerating the wheel loader 1 and a rear inclined posture of the vehicle body when accelerating the wheel loader 1. Moreover, the transmission output torque may be calculated, based upon the hydraulic pressure for operating the working mechanism 7 as a cargo handling device.

In order to maximize the vibration suppression effect, the second set pressure P2 may be a minimum relief pressure (e.g., 0). In this case, the second main line 37B and the first main line 37A are in a communicating state. That is, the power transmission from the second hydraulic pump motor 38 to the first hydraulic pump motor 36 is cut off. Thus, the "power acting in a direction of decreasing the vehicle speed" is not transmitted to the engine 9 to generate no engine brake. As a result, the transmission output torque in an unintended direction can be set at 0. In this case, since the transmission output torque in an unintended direction is 0, the fourth set pressure P4 can be set at a lower value. As a result, the rate of the shaded area of the transmission output torque in an intended direction can be increased.

In any case, when the vehicle travels in the "vibration suppression control ON state", as shown in FIG. 8, the shaded area of the transmission output torque can be reduced to curb variations in the output torque. As a result, the amplitude of the output torque can be smaller to suppress the vibration of the traveling vehicle.

In addition, as shown in FIG. 8, the controller 43 can set relief start pressures of the variable relief valves 51A, 51B such that the transmission output torque has any value between the "vibration suppression control OFF state" and the "vibration suppression control ON state (maximum vibration suppression effect)". When the operation mode is switched from the "vibration suppression control OFF state" to the "vibration suppression control ON state (maximum vibration suppression effect)", the wheel loader 1 can get a shock. Therefore, such a shock can be suppressed by setting any value as described above. This shock suppression can improve riding quality.

Next, an explanation will be made of a case of decelerating the wheel loader 1 to stop, or an operation after the time t2 shown in FIGS. 4 to 7. An operator decreases the operating amount of the accelerator pedal 8A at the time t2. In a case where the operating amount of the accelerator pedal 8A is reduced to the first operating amount (e.g., 0) or less for a certain period of time (e.g., 0.1 to 1 second), the controller 43 gradually increases the relief start pressure of the second variable relief valve 51B from the second set pressure P2 to a third set pressure P3, which is higher than the second set pressure P2 (P2<P3). As a result, the power is gradually transmitted from the second hydraulic pump motor 38 to the first hydraulic pump motor 36. The power is absorbed into the engine 9 from the first hydraulic pump motor 36 via the planetary gear mechanism 32 (engine brake). As a result, an engine brake can be applied to decelerate the vehicle. As described above, the operator can operate the engine brake as intended. The first operating amount can be set as an operating amount switching between acceleration and deceleration of the wheel loader 1, for example. The first operating amount can be set to be larger as the vehicle speed rises, for example. On the other hand, the third set pressure P3 can be set as a relief pressure capable of acquiring a desired engine brake, for example. In this case, the third set pressure P3 can be set as a pressure which is higher than the second set pressure P2 and lower than the first set pressure P1, for example (P2<P3<P1).

In addition, the second variable relief valve 51B is operated by increasing the tilting angle of the second hydraulic pump motor 38 and setting the pressure of the second main line 37B at a third set pressure P3 or more. That is, the second variable relief valve 51B is controlled so as to raise the relief start pressure of the second variable relief valve 51B (e.g., to a third set pressure P3) and set the tilting angle of the second hydraulic pump motor 38 to be higher than the tilting angle of the first hydraulic pump motor 36. This control sets the pressure of the second main line 37B at a high pressure. Then, the pressure of the second main line 37B is set as a higher pressure than the relief start pressure of the second variable relief valve 51B (e.g., third set pressure P3) to allow the second variable relief valve 51B to respond and the second main line 37B to release the hydraulic oil of the second main line 37B while maintaining the relief start pressure at a high level. As a result, energy loss (pressure loss) is generated to reduce the vehicle speed. The series of operations are referred to as "CVT brake".

As described above, the second variable relief valve 51B can be operated as intended to generate loss and reduce the vehicle speed (CVT brake). Since the hydraulic oil flows from the second hydraulic pump motor 38 to the first hydraulic pump motor 36 after the time t2, the tilting angle of the first hydraulic pump motor 36 is set to be smaller and the tilting angle of the second hydraulic pump motor 38 is set to be larger to raise the pressure of the second main line 37B. As a result, not only an engine brake but also a CVT brake are applied so as to more significantly reduce the vehicle speed. The use of an engine brake and a CVT brake in combination can reduce loads on a service brake. In FIG. 4, the service brake is applied at the time t3 to reduce the vehicle speed to 0 km/h to stop.

In the "vibration suppression control ON state", variations in the transmission output torque are absorbed into the hydrostatic continuously variable transmission mechanism 34. Accordingly, even if external forces are applied to the wheel loader 1 as a working vehicle based upon road surface conditions or vehicle vibration at the traveling, variations in the output torque can be reduced to suppress the vibration of the traveling vehicle. The vibration can be absorbed into the hydrostatic continuously variable transmission mechanism 34 to transmit no power to the planetary gear mechanism 32 and thus reduce gear loss. Even in a case where a large vibration is generated in a device with an unlimited capacity unlike an accumulator, torque variations can be reduced. Thus, the ride quality in a traveling vehicle can be improved. Since the vibration of the vehicle body rather than the working mechanism 7 is suppressed, unstable operation of the working mechanism 7 can be suppressed even by operating the working mechanism 7 at the traveling.

When an operator reduces the operating amount of the accelerator pedal 8A, the traveling mode can be switched to the "vibration suppression control OFF state" to apply the engine brake to reduce the vehicle speed. In this case, the relief start pressure of the second variable relief valve 51B can gradually be raised to suppress a sudden rise in the brake torque and reduce the vehicle speed with less load on the operator. As a result, using this technique, the ride quality in a traveling vehicle can be improved. The use of an engine brake and a CVT brake in combination can reduce loads on a service brake.

Even in a case where the power of the transmission 21 is transmitted in the internal direct connection, the brake is controlled in the same manner as in the continuously variable transmission. The brake control in the internal direct connection will be described, primarily with reference to differences from the continuously variable transmission. In the internal direct connection, the tilting of the first hydraulic pump motor 36 (discharged capacity) is increased to a predetermined value or more and the tilting of the second hydraulic pump motor 38 is set in a neutral state to operate braking in the hydrostatic continuously variable transmission mechanism 34 and set the rotational speed of the first hydraulic pump motor 36 at 0. The internal direct connection described below is in the state of releasing the second clutch 40.

In a section from the time t1 to the time t2 when the vehicle travels at a constant speed, the "power acting in a direction of decreasing the vehicle speed" inputted from the wheels 2, 4 is transmitted to the first hydraulic pump motor 36 via the idler gear 29 and the planetary gear mechanism 32. At this time, the planetary output shaft 32A as an output shaft of the planetary gear mechanism 32 is rotated counterclockwise to allow the hydraulic oil discharged from the first hydraulic pump motor 36 to flow into the first main line 37A via the second main line 37B, the connecting line 42, and the second variable relief valve 51B. That is, with a low relief start pressure of the second variable relief valve 51B (e.g., second set pressure P2), the power transmission from the first hydraulic pump motor 36 to the second hydraulic pump motor 38 is cut off. As a result, the "power acting in a direction of decreasing the vehicle speed" inputted from the wheels 2, 4 is partially or entirely absorbed into the hydrostatic continuously variable transmission mechanism 34. Consequently, transmission of the "power acting in a direction of decreasing the vehicle speed" to the engine 9 can be suppressed to reduce engine brake. During such a controlling operation, the rotational speed of the first hydraulic pump motor 36 is temporarily not 0 to reduce the transmission output torque in an unintended direction (to remove a negative-side shaded area).

In addition, the "power acting in a direction of increasing the vehicle speed" inputted from the wheels 2, 4 is also transmitted to the first hydraulic pump motor 36 via the idler gear 29 and the planetary gear mechanism 32. At this time, the planetary output shaft 32A as an output shaft of the planetary gear mechanism 32 is rotated clockwise to allow the hydraulic oil discharged from the first hydraulic pump motor 36 to flow into the second hydraulic pump motor 38 through the first main line 37A. The controller 43 adjusts the value of the first main line 37A (pressure) by lowering the relief start pressure of the first variable relief valve 51A (fourth set pressure P4) so as to acquire the transmission output torque as calculated. The power inputted from the engine 9 and the "power acting in a direction of increasing the vehicle speed" inputted from the wheels 2, 4 are inputted to the first hydraulic pump motor 36, and the pressure of the first main line 37A does not exceed the relief start pressure of the first variable relief valve 51A (fourth set pressure P4), and the transmission output torque does not increase more than necessary. As a result, the transmission output torque in an intended direction can be restricted (can remove a positive-side shaded area).

As described above, in an embodiment, a first pressure of the first variable relief valve 51A (first set pressure P1) is set to be higher than a second pressure of the second variable relief valve 51B (second set pressure P2) (P1>P2). As a result, in an embodiment, a "power transmission capability from the first hydraulic pump motor 36 to the second hydraulic pump motor 38" and a "power transmission capability from the second hydraulic pump motor 38 to the first hydraulic pump motor 36" are allowed to be different. In this case, according to an embodiment, the second variable relief valve 51B is a variable relief valve capable of allowing the controller 43 to change a set pressure. Then, the controller 43 allows the "power transmission capability from the first hydraulic pump motor 36 to the second hydraulic pump motor 38" and the "power transmission capability from the second hydraulic pump motor 38 to the first hydraulic pump motor 36" to be different from each other by setting the set pressure of the second variable relief valve 51B at a second pressure (second set pressure P2), which is less than the first pressure (first set pressure P1) during the vehicle's traveling. In other words, the "power transmitted from the first hydraulic pump motor 36 to the second hydraulic pump motor 38" and the "power transmitted from the second hydraulic pump motor 38 to the first hydraulic pump motor 36" are allowed to be different from each other.

Thus, if the pressure of the second main line 37B exceeds the second pressure (second set pressure P2), the second variable relief valve 51B will be in a relief state (communicating state) to allow the hydraulic oil to flow from the second main line 37B to the first main line 37A. As a result, power transmission can be reduced between the first hydraulic pump motor 36 and the second hydraulic pump motor 38 via the second main line 37B, and torque variations (variations in the transmission output torque) can be absorbed into the planetary continuously variable transmission mechanism 31 (more specifically, the hydrostatic continuously variable transmission mechanism 34).

Thus, even if external forces are applied to the wheel loader 1, based upon vehicle vibration and the like from irregularities on the road surface at the traveling, the resulting variations in the transmission output torque can be reduced. Consequently, the vibration of a traveling vehicle can be suppressed to improve the ride quality in the traveling vehicle. In addition, torque variations are absorbed into the planetary continuously variable transmission mechanism 31 (more specifically, the hydrostatic continuously variable transmission mechanism 34), which causes no capacity restriction as in accumulators. Thus, even in a case where a large vibration is generated, torque variations can be reduced. Since the vibration is suppressed in the planetary continuously variable transmission mechanism 31 (more specifically, the hydrostatic continuously variable transmission mechanism 34), unstable operation of the working mechanism 7 can be suppressed even by operating the working mechanism 7 at the traveling.

In an embodiment, the second pressure (second set pressure P2) is a minimum relief pressure, which can be changed at the second variable relief valve 51B. Thus, the power transmission capability can be reduced between the first hydraulic pump motor 36 and the second hydraulic pump motor 38 via second main line 37B at the maximum level. That is, the effect of absorption of (reduction in) torque variations, based upon the flow of the hydraulic oil from the second main line 37B to the first main line 37A, can be maximized.

In an embodiment, in a case the operating amount θ of the accelerator pedal 8A that is an operating member accelerating the vehicle is reduced to a first operating amount or less, the first operating amount switching between acceleration and deceleration, the controller 43 raises a power transmission capability from the second hydraulic pump motor 38 to the first hydraulic pump motor 36 by changing a relief start pressure of the second variable relief valve 51B from the second pressure (second set pressure P2) to a third pressure (third set pressure P3), which is higher than the second pressure. Thus, in a case an operator reduces the operating amount of the accelerator pedal 8A, the engine brake can be applied to reduce the vehicle speed.

Further, by gradually raising the relief start pressure of the second variable relief valve 51B to the third pressure (third set pressure P3), a sudden rise in the brake torque can be suppressed. As a result, the vehicle speed can be reduced with less load on the operator to improve the ride quality in a traveling vehicle. By increasing the tilting angle of the second hydraulic pump motor 38 as required, the pressure of the second main line 37B is raised and actively released at the second variable relief valve 51B to successfully use an engine brake and a CVT brake in combination. As a result, loads on the service brake can be reduced.

In addition, a first operating amount as a threshold value of the operating amount θ of the accelerator pedal 8A can be set to increase as the vehicle speed rises. In this case, only the accelerator pedal 8A (one operating member) can control the tractive force and vehicle speed. That is, only the accelerator pedal 8A can accelerate and decelerate the vehicle. As a result, the operability can be improved.

In an embodiment, the first variable relief valve 51A is a variable relief valve capable of allowing the controller 43 to change a set pressure. Then, the controller 43 changes a ratio between a "power transmission capability from the first hydraulic pump motor 36 to the second hydraulic pump motor 38" and a "power transmission capability from the second hydraulic pump motor 38 to the first hydraulic pump motor 36" by changing a set pressure of the first variable relief valve 51A according to a state quantity of the vehicle at the vehicle's traveling. In this case, the controller 43 changes the relief start pressure of the first variable relief valve 51A from a first pressure (first set pressure P1) to a fourth pressure (fourth set pressure P4), which is lower than the first pressure and the third pressure (third set pressure P3) and higher than the second pressure (second set pressure P2) (P1, P3>P4>P2) when the operating amount of the accelerator pedal 8A is constant, for example. As a result, increases in the transmission output torque more than necessary can be suppressed.

Herein, the controller 43 reads the vehicle speed from the operating amount θ of the accelerator pedal 8A kept constant, calculates the transmission output torque required for its vehicle speed, and calculates a fourth pressure (fourth set pressure P4) so as to acquire the output torque as calculated. In this case, the controller 43 can calculate the fourth pressure (fourth set pressure P4), based upon the rotational force served for the traveling of a vehicle, the theoretical discharge volume of the first hydraulic pump motor 36, and the theoretical discharge volume of the second hydraulic pump motor 38. The controller 43 can calculate the fourth pressure (fourth set pressure P4), based upon measurements of the angle of rotation, rotational speed, rotational acceleration, and rotational jerk of a vehicle with an axis perpendicular to a traveling direction of a vehicle as a rotational center and/or measurements from a pressure measuring device (first pressure detector 46) mounted on the first main line 37A. The controller 43 can calculate the fourth pressure (fourth set pressure P4), based upon hydraulic pressures operating the working mechanism 7. In any case, the controller 43 changes a ratio between the "power transmission capability from the first hydraulic pump motor 36 to the second hydraulic pump motor 38 at the vehicle's traveling" and the "power transmission capability from the second hydraulic pump motor 38 to the first hydraulic pump motor 36" by sending a signal to allow the relief start pressure of the first variable relief valve 51A to be a fourth pressure (fourth set pressure P4) according to a state quantity of the vehicle. As a result, increases in the transmission output torque more than necessary can be suppressed.

Figure 9:
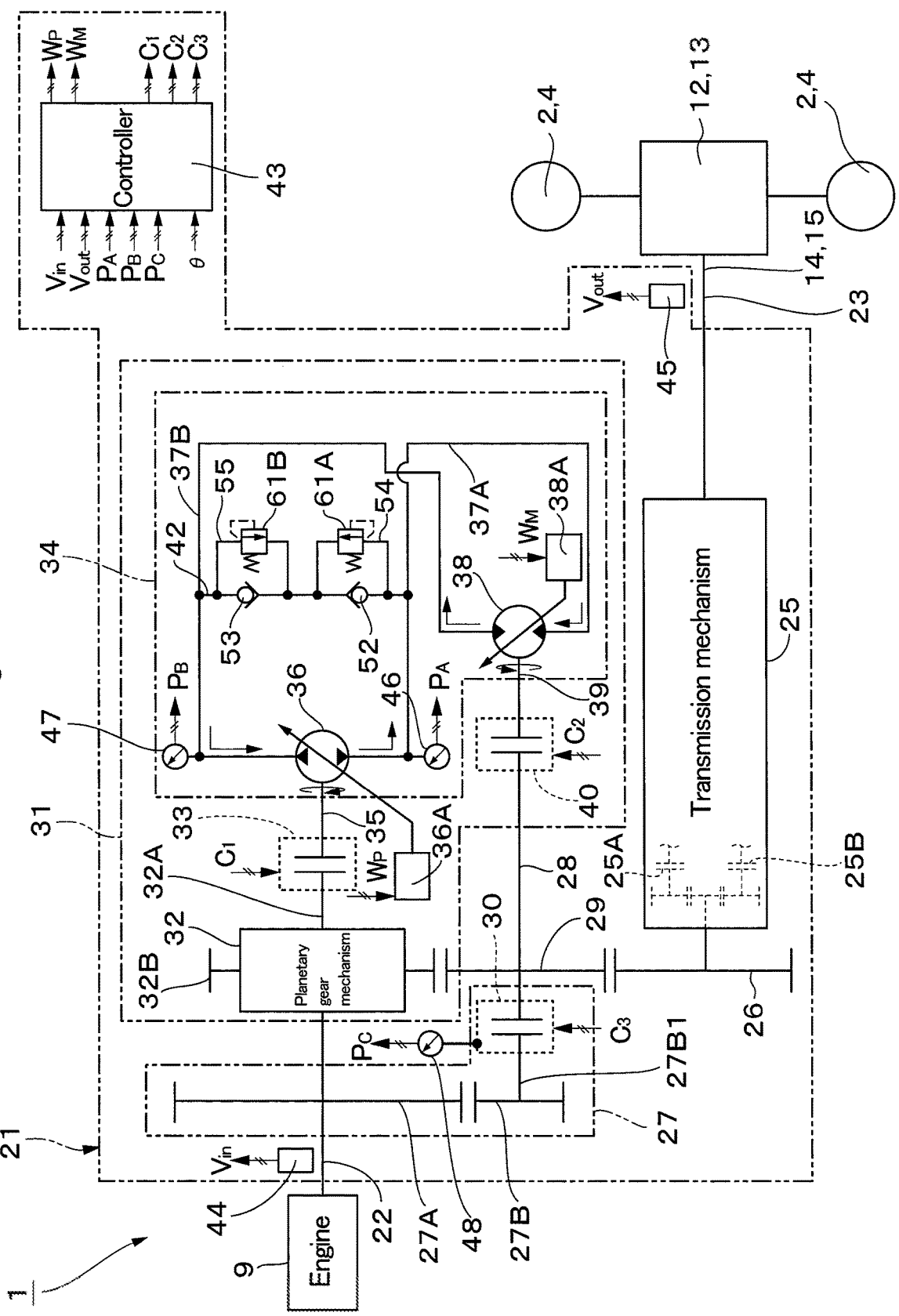
FIG. 9 is a configuration diagram showing power transmission paths according to a first variant together with a controller.

In addition, the embodiments are explained by taking the case where a first variable relief valve 51A as a first relief valve and a second variable relief valve 51B as a second relief valve are each an electrically-operated relief valve capable of allowing the controller 43 to change the set pressure. However, not limited thereto, and for example, a set pressure fixed relief valve having a fixed set pressure may be used. That is, FIG. 9 shows a first variant. In the first variant, the first relief valve is the first fixed relief valve 61A with a set pressure fixed to a first pressure (e.g., first set pressure P1), and the second relief valve is a second fixed relief valve 61B with a set pressure fixed to a second pressure (e.g., second set pressure P2). In this case, by setting the first pressure of the first fixed relief valve 61A to be higher than the second pressure of the second fixed relief valve 61B, the "power transmission capability from a first hydraulic pump motor 36 to a second hydraulic pump motor 38" and the "power transmission capability from a second hydraulic pump motor 38 to a first hydraulic pump motor 36" are allowed to be different from each other. In other words, the "power transmitted from the first hydraulic pump motor 36 to the second hydraulic pump motor 38" and the "power transmitted from the second hydraulic pump motor 38 to the first hydraulic pump motor 36" are allowed to be different from each other. As a result, power transmission can be reduced (absorbed) between the first hydraulic pump motor 36 and the second hydraulic pump motor 38 via the second main line 37B to suppress the vibration of a traveling vehicle.

Figure 10:
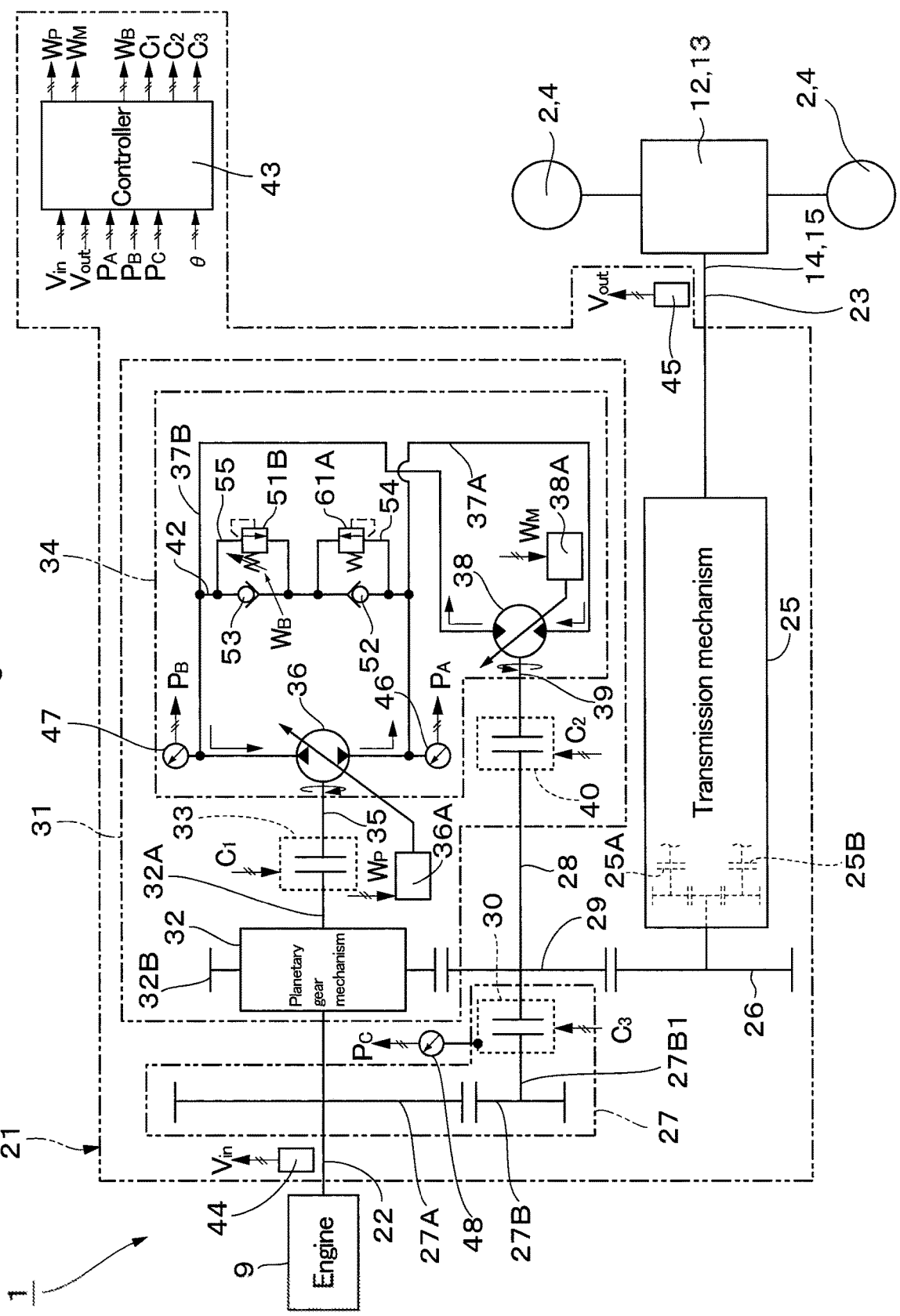
FIG. 10 is a configuration diagram showing power transmission paths according to a second variant together with a controller.

In addition, for example, as in a second variant shown in FIG. 10, the first relief valve may be the first fixed relief valve 61A with a set pressure fixed to a first pressure (e.g., first set pressure P1), while the second relief valve may be the second variable relief valve 51B capable of allowing the controller 43 to change the set pressure. In this case, the controller 43 allows the "power transmission capability from the first hydraulic pump motor 36 to the second hydraulic pump motor 38" and the "power transmission capability from the second hydraulic pump motor 38 to the first hydraulic pump motor 36" to be different from each other by setting the set pressure of the second variable relief valve 51B at a second pressure (second set pressure P2) at the vehicle's traveling. In other words, the "power transmitted from the first hydraulic pump motor 36 to the second hydraulic pump motor 38" and the "power transmitted from the second hydraulic pump motor 38 to the first hydraulic pump motor 36" are allowed to be different from each other.

Figure 11:
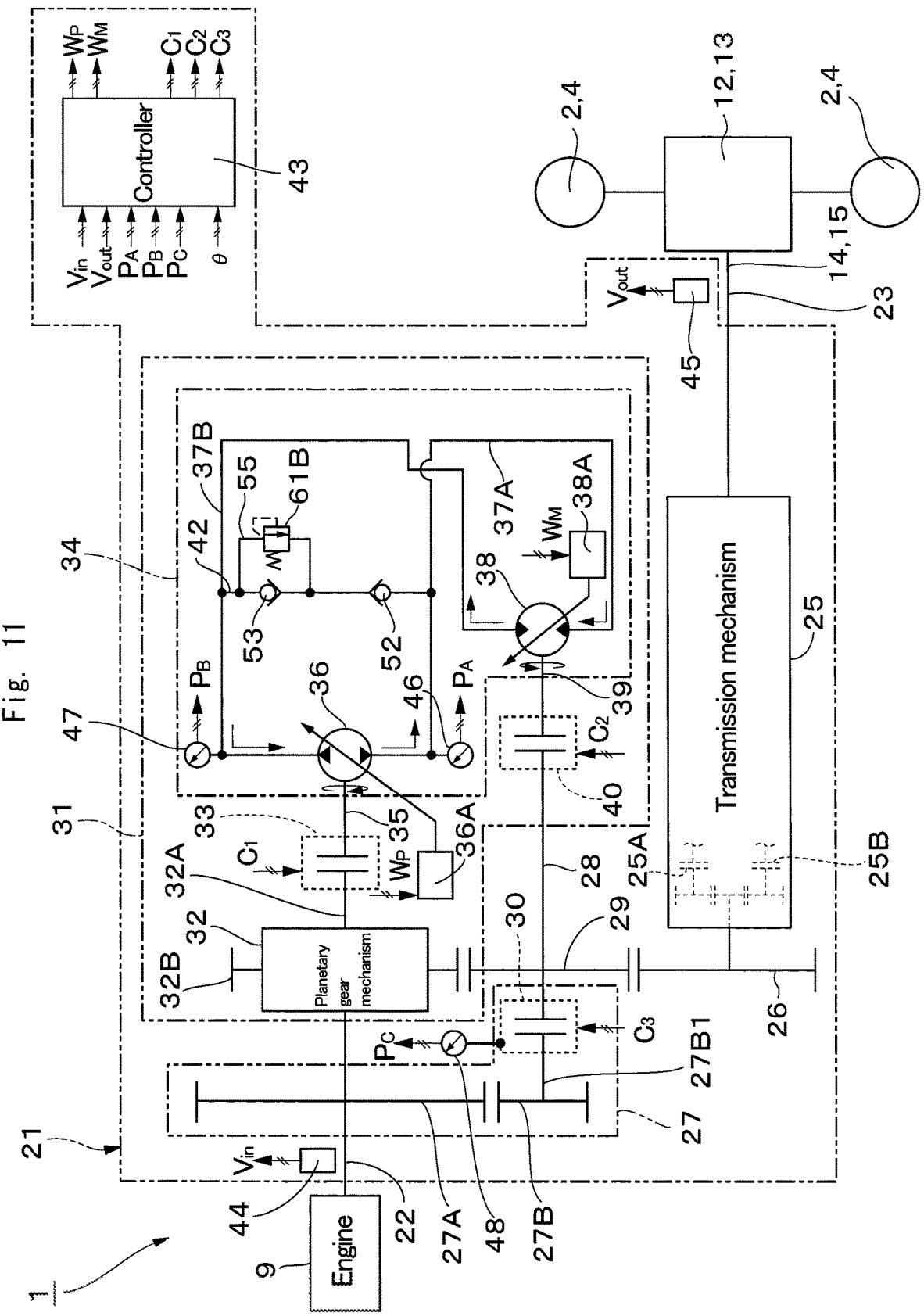
FIG. 11 is a configuration diagram showing power transmission paths according to a third variant together with a controller.

In addition, for example, as in a third variant shown in FIG. 11, a first relief valve may be omitted. In the third variant, the hydrostatic continuously variable transmission mechanism 34 includes a second fixed relief valve 61B with a set pressure fixed to a second pressure (e.g., second set pressure P2) and a pair of check valves 52, 53. That is, in the third variant, the hydrostatic continuously variable transmission mechanism 34 includes no first relief valve, but a first check valve 52 allowing the flow of a hydraulic oil from the second main line 37B to the first main line 37A to be in a communicating state and cutting off the flow of the hydraulic oil from the first main line 37A to the second main line 37B. In this case, the flow of a hydraulic oil from the first main line 37A to the second main line 37B remains in a blocking state (i.e., corresponding to a configuration where a first relief valve having an infinite relief start pressure is provided), while the pressure of the second fixed relief valve 61B is set as a second pressure (e.g., second set pressure P2).

As a result, the "power transmission capability from the first hydraulic pump motor 36 to the second hydraulic pump motor 38" and the "power transmission capability from the second hydraulic pump motor 38 to the first hydraulic pump motor 36" are allowed to be different from each other. In other words, the "power transmitted from the first hydraulic pump motor 36 to the second hydraulic pump motor 38" and the "power transmitted from the second hydraulic pump motor 38 to the first hydraulic pump motor 36" are allowed to be different from each other.

Figure 12:
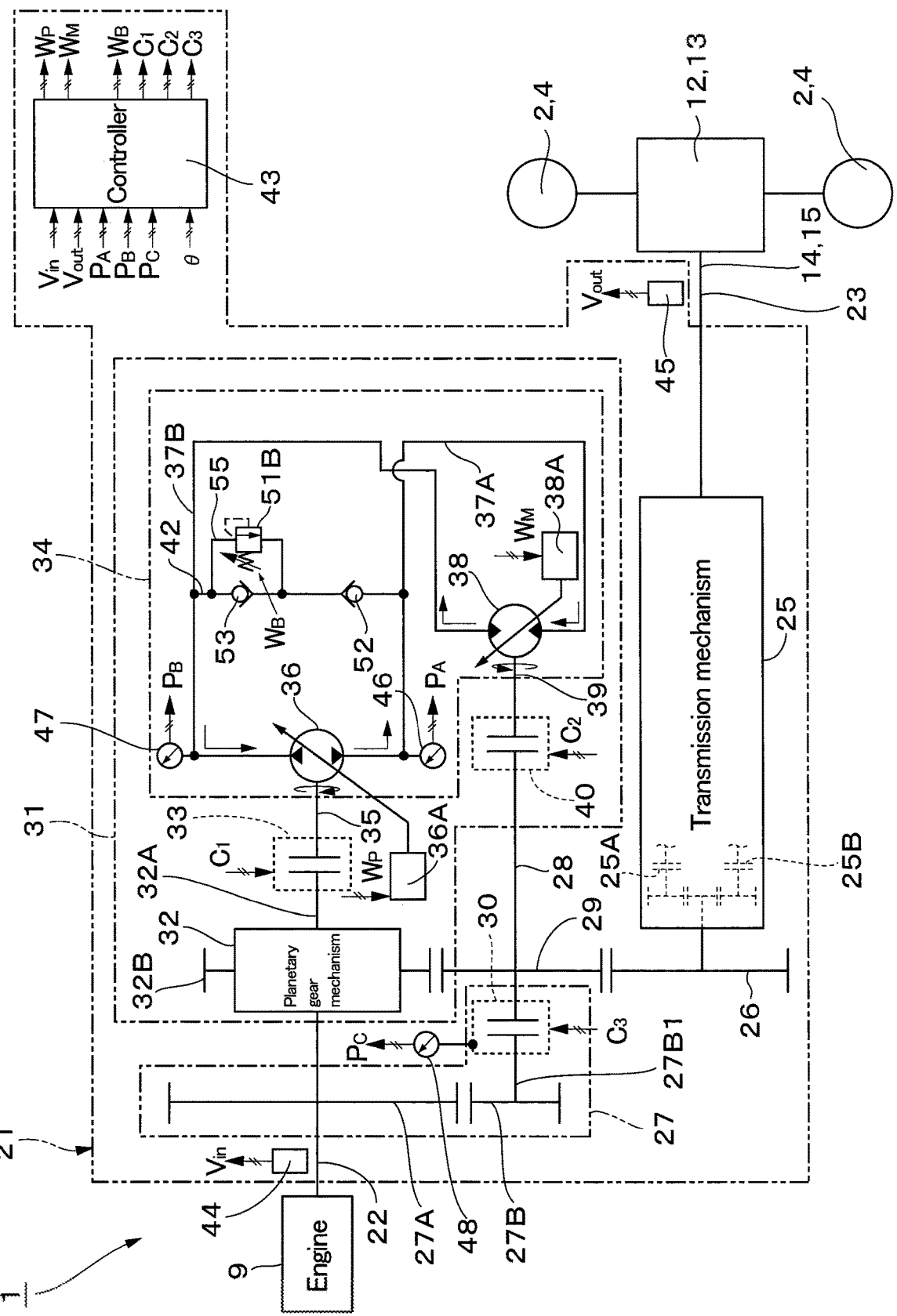
FIG. 12 is a configuration diagram showing power transmission paths according to a fourth variant together with a controller.

In addition, for example, as in a fourth variant shown in FIG. 12, the power transmission device according to the present invention may be configured to change the second fixed relief valve 61B of the third variant shown in FIG. 11 to the second variable relief valve 51B. In this case, the controller 43 allows the "power transmission capability from the first hydraulic pump motor 36 to the second hydraulic pump motor 38" and the "power transmission capability from the second hydraulic pump motor 38 to the first hydraulic pump motor 36" to be different from each other by setting the set pressure of the second variable relief valve 51B at a second pressure (second set pressure P2) at the vehicle's traveling. In other words, the "power transmitted from the first hydraulic pump motor 36 to the second hydraulic pump motor 38" and the "power transmitted from the second hydraulic pump motor 38 to the first hydraulic pump motor 36" are allowed to be different from each other.

Figure 13:
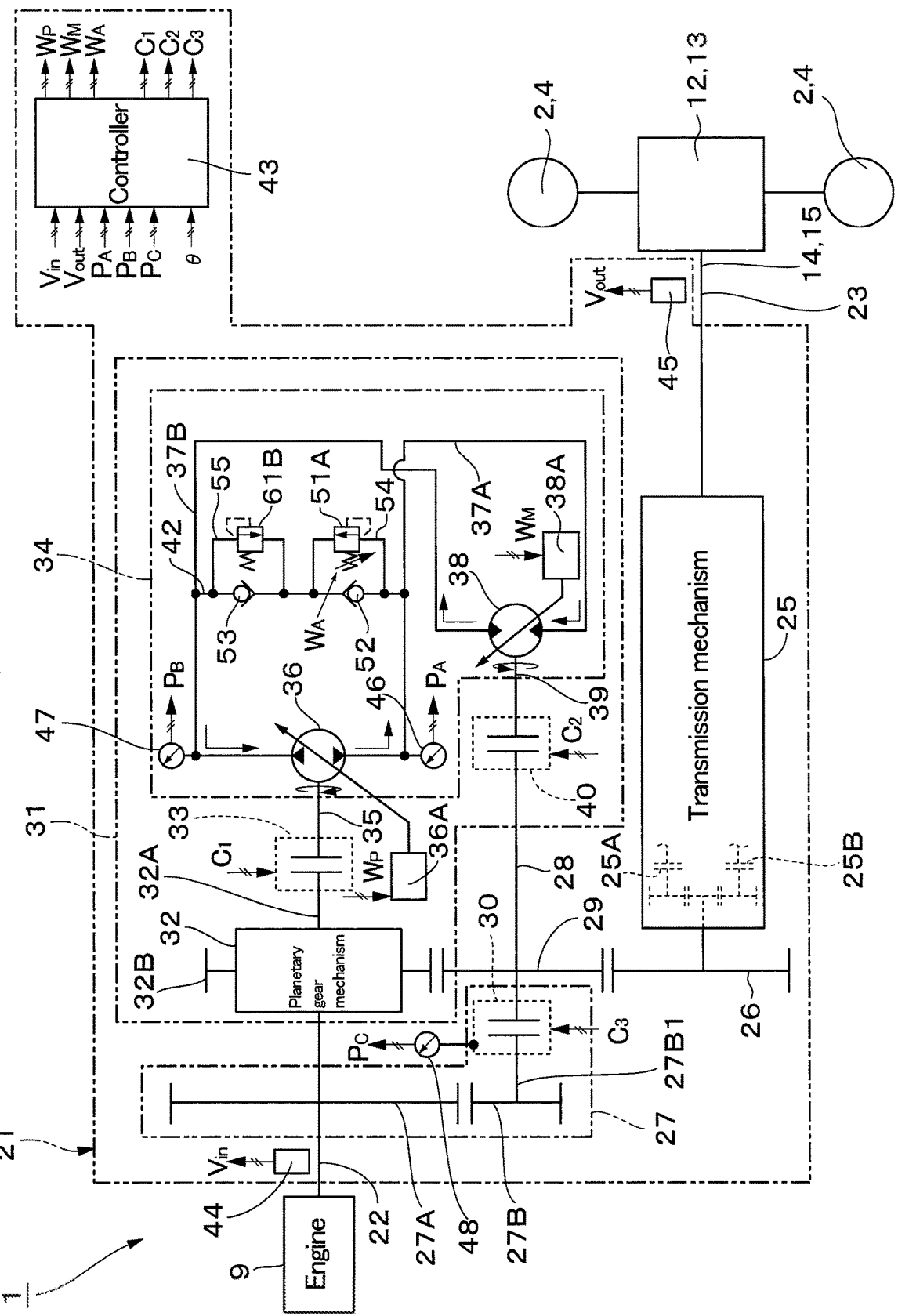
FIG. 13 is a configuration diagram showing power transmission paths according to a fifth variant together with a controller.

In addition, for example, as in a fifth variant shown in FIG. 13, the first relief valve may be the first variable relief valve 51A, and the second relief valve may be the second fixed relief valve 61B. In this case, the controller 43 allows the "power transmission capability from the first hydraulic pump motor 36 to the second hydraulic pump motor 38" and the "power transmission capability from the second hydraulic pump motor 38 to the first hydraulic pump motor 36" to be different (allows the ratio of the power transmission capability to be changed) by changing the set pressure of the first variable relief valve 51A (according to a state quantity of the vehicle) at the vehicle's traveling. In other words, the "power transmitted from the first hydraulic pump motor 36 to the second hydraulic pump motor 38" and the "power transmitted from the second hydraulic pump motor 38 to the first hydraulic pump motor 36" are allowed to be different from each other.

Figure 14:
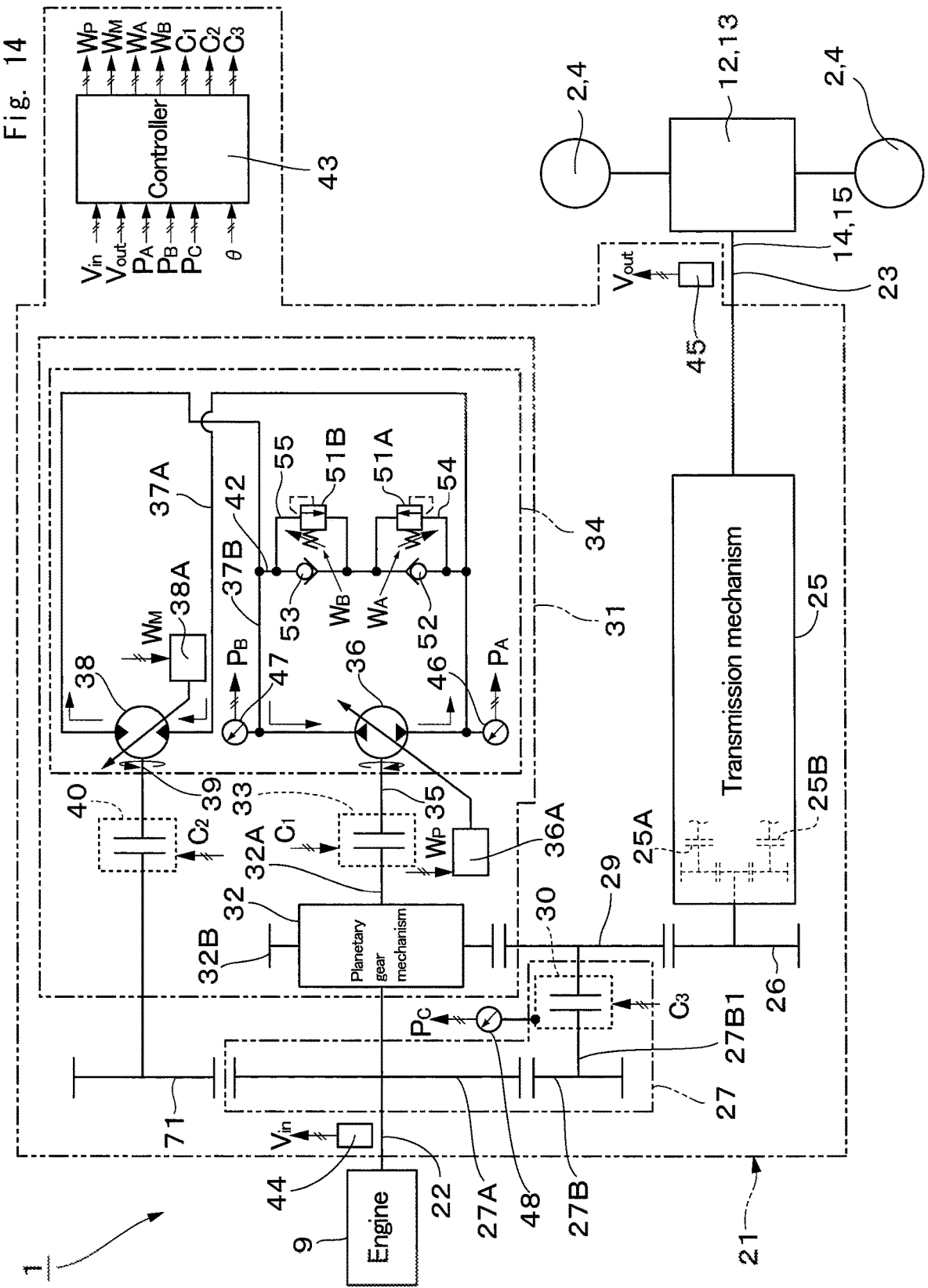
FIG. 14 is a configuration diagram showing power transmission paths according to a sixth variant together with a controller.

In addition, the embodiments and the first to fifth variants are explained by taking the case where the second hydraulic pump motor 38 is configured to be connected to the idler gear 29 via the second clutch 40. However, not limited thereto, and for example, as in a sixth variant shown in FIG. 14, the second hydraulic pump motor 38 may be configured to be connected to "a transmission gear 71 meshing with an input side gear 27A of a direct connecting mechanism 27" via the second clutch 40.

In addition, the embodiments are explained by taking the case where "the hydrostatic continuously variable transmission mechanism 34 configured by connecting the first hydraulic pump motor 36 and the second hydraulic pump motor 38 with a pair of main lines 37A, 37B" is disposed between the first clutch 33 and the second clutch 40. However, not limited thereto, and for example, as in a seventh variant shown in FIG. 15, an electric continuously variable transmission mechanism 81 may be disposed between the first clutch 33 and the second clutch 40. That is, a variator of a continuously variable transmission mechanism may be a hydraulic pump motor, or an electric motor generator.

Figure 15:
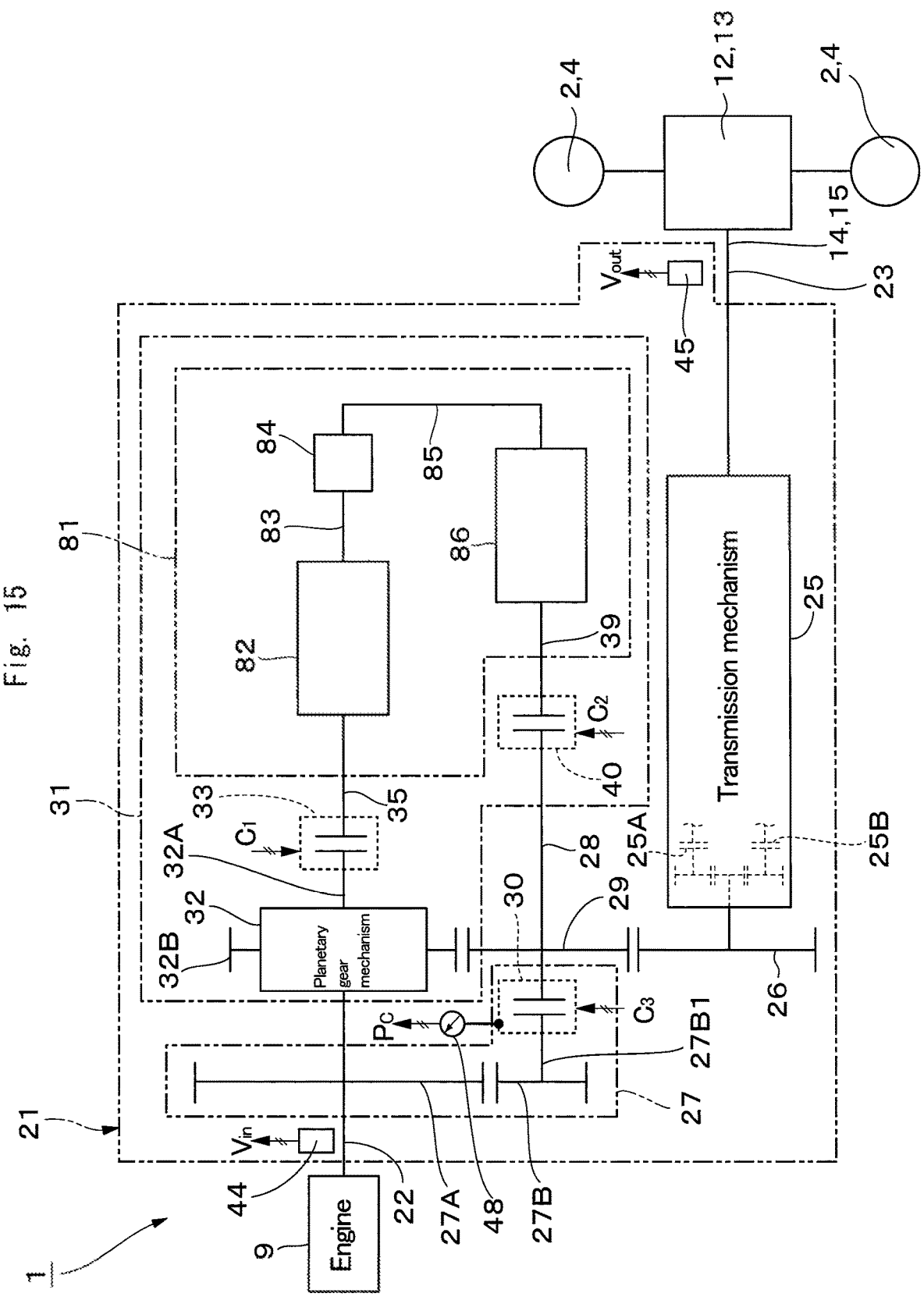
FIG. 15 is a configuration diagram showing power transmission paths according to a seventh variant together with a controller.

In the seventh variant shown in FIG. 15, the electric continuously variable transmission mechanism 81 includes a first electric motor generator 82 disposed on the input shaft 22 side, a controller 84 connected via the first electric motor generator 82 and the first wire 83, and a second electric motor generator 86 connected via the controller 84 and the second wire 85. The first wire 83 transmits the power between the first electric motor generator 82 and the controller 84. The second wire 85 transmits the power between the second electric motor generator 86 and the controller 84. The controller 84 controls the wheel loader 1 at the traveling to allow the "power transmitted from the first electric motor generator 82 to the second electric motor generator 86" and the "power transmitted from the second electric motor generator 86 to the first electric motor generator 82" to be different from each other.

The controller 84 can be configured to include a storage battery (power storage source), for example. The controller 84 controls the wheel loader 1 to allow the "power transmitted from the first electric motor generator 82 to the second electric motor generator 86" and the "power transmitted from the second electric motor generator 86 to the first electric motor generator 82" to be different from each other by receiving and discharging power with the storage battery, for example. In this case, the controller 84, at the traveling of the wheel loader 1, sets the "power transmitted from the first electric motor generator 82 to the second electric motor generator 86" to be higher than the "power transmitted from the second electric motor generator 86 to the first electric motor generator 82", for example. Such a seventh variant can suppress the vibration of a traveling vehicle by absorbing the power, based upon torque variations between the first electric motor generator 82 and the second electric motor generator 86.

In addition, the above configuration can be changed, removed or added in the scope of the present invention accordingly. For example, the embodiments are explained by taking the case where the transmission 21 is configured to include a transmission mechanism 25 as a stepped transmission mechanism (multi-stage transmission mechanism) and a direct connecting mechanism 27. However, not limited thereto, and for example, a direct connecting mechanism 27 and/or a transmission mechanism 25 may be removed (omitted).

In addition, the embodiments are explained by taking the case where the transmission 21 is configured to include the planetary gear mechanism 32. That is, the embodiments are explained by taking the case of a planetary continuously variable transmission mechanism 31 as a continuously variable transmission mechanism. However, not limited thereto, and for example, a planetary gear mechanism 32 may be removed (omitted). In other words, a continuously variable transmission mechanism may be configured to include a planetary gear mechanism 32 and a hydrostatic continuously variable transmission mechanism 34 (or an electric continuously variable transmission mechanism 81), or to include no planetary gear mechanism 32, but a hydrostatic continuously variable transmission mechanism 34 (or an electric continuously variable transmission mechanism 81).

The embodiments are explained by taking the case where a transmission 21 as a power transmission device for a vehicle is mounted on a wheel loader 1 as a vehicle (working vehicle). However, not limited thereto, and for example, such transmissions can widely be used as power transmission devices for construction vehicles such as wheel-type excavators, transport vehicles such as lift trucks, farm vehicles such as tractors and the like.

DESCRIPTION OF REFERENCE NUMERALS

1: Wheel loader (Vehicle)
8A: Accelerator pedal (Operating member)
9: Engine (Prime mover)
12: Front axle (Traveling device)
13: Rear axle (Traveling device)
21: Transmission (Power transmission device for a vehicle)
22: Input shaft
23: Output shaft
31: Planetary continuously variable transmission mechanism (Continuously variable transmission mechanism)
36: First hydraulic pump motor
37A, 37B: Main line
38: Second hydraulic pump motor
43: Controller
51A: First variable relief valve (First relief valve)
51B: Second variable relief valve (Second relief valve)
52: First check valve (Check valve)
61A: First fixed relief valve (First relief valve)
61B: Second fixed relief valve (Second relief valve)
82: First electric motor generator
83: First wire
84: Controller
85: Second wire
86: Second electric motor generator

The invention claimed is:

1. A power transmission device for a vehicle, comprising:
an input shaft rotated by a prime mover mounted on a vehicle;
an output shaft outputting rotation to a traveling device of the vehicle; and
a continuously variable transmission mechanism disposed between the input shaft and the output shaft, and changing speed of a rotation on the input shaft side and transmitting power to the output shaft side, wherein
the continuously variable transmission mechanism comprises:
a first hydraulic pump motor disposed on the input shaft side;
a second hydraulic pump motor connected to the first hydraulic pump via a pair of main lines composed of a first main line and a second main line;
a first relief valve allowing the flow of a hydraulic oil from the first main line to the second main line to be in a blocking state in a case the pressure of the first main line is a first set pressure or less and to be in a communicating state in a case the pressure of the first main line exceeds the first set pressure; and
a second relief valve allowing the flow of a hydraulic oil from the second main line to the first main line to be in a blocking state in a case the pressure of the second main line is a second set pressure or less and to be in a communicating state in a case the pressure of the second main line exceeds the second set pressure,
the second relief valve is a variable relief valve configured to allow a controller to change the second set pressure,
the controller allows the power transmitted from the first hydraulic pump motor to the second hydraulic pump motor and the power transmitted from the second hydraulic pump motor to the first hydraulic pump motor to be different from each other by setting the set pressure of the second relief valve at the second set pressure, which is less than the first set pressure of the first relief valve, and in a case an operating amount of an operating member accelerating the vehicle is reduced to a first operating amount or less, the first operating amount switching between acceleration and deceleration, the controller raises a power transmission capability from the second hydraulic pump motor to the first hydraulic pump motor by changing a relief start pressure of the second relief valve from the second set pressure to a third set pressure, which is higher than the second set pressure.

2. The power transmission device for a vehicle according to claim 1, wherein
the second set pressure is a minimum relief pressure, which can be changed at the second relief valve.

3. The power transmission device for a vehicle according to claim 1, wherein
the first operating amount of the operating member is set to increase as the speed of the vehicle rises.

4. The power transmission device for a vehicle according to claim 1, comprising
as a replacement for the first relief valve, a check valve allowing the flow of a hydraulic oil from the second main line to the first main line to be in a communicating state and the flow of a hydraulic oil from the first main line to the second main line to be in a blocking state.

5. The power transmission device for a vehicle according to claim 1, wherein
the first relief valve is a variable relief valve configured to allow the controller to change the first set pressure, and
the controller changes a ratio between a power transmission capability from the first hydraulic pump motor to the second hydraulic pump motor and a power transmission capability from the second hydraulic pump motor to the first hydraulic pump motor by changing the first set pressure of the first relief valve according to a state quantity of the vehicle.

6. The power transmission device for a vehicle according to claim 1, wherein
the continuously variable transmission mechanism further comprises a planetary gear mechanism connected to the input shaft side, and
the first hydraulic pump motor is disposed on the output side of the planetary gear mechanism.

* * * * *